(12) United States Patent
Lee et al.

(10) Patent No.: US 7,925,103 B2
(45) Date of Patent: Apr. 12, 2011

(54) ADAPTIVE $2^n$-ARY TREE GENERATING METHOD, AND METHOD AND APPARATUS FOR ENCODING AND DECODING 3D VOLUME DATA USING IT

(75) Inventors: Shinjun Lee, Seoul (KR); Mahnjin Han, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1469 days.

(21) Appl. No.: 11/073,686

(22) Filed: Mar. 8, 2005

(65) Prior Publication Data

US 2005/0195191 A1    Sep. 8, 2005

Related U.S. Application Data

(60) Provisional application No. 60/550,735, filed on Mar. 8, 2004, provisional application No. 60/586,734, filed on Jul. 12, 2004.

(30) Foreign Application Priority Data

Feb. 15, 2005 (KR) .................. 10-2005-0012424

(51) Int. Cl.
*G06K 9/36* (2006.01)

(52) U.S. Cl. ........ 382/233; 382/232; 382/240; 382/226; 382/299; 382/305

(58) Field of Classification Search .................. 382/232, 382/233, 240, 226, 154, 299, 285, 305; 345/424, 345/419; 707/103; 700/100
See application file for complete search history.

(56) References Cited

U.S. PATENT DOCUMENTS 6,501,848 B1 * 12/2002 Carroll et al. ................. 382/128
(Continued)

FOREIGN PATENT DOCUMENTS

JP          10-261965          9/1998
(Continued)

OTHER PUBLICATIONS

European Search Report issued in corresponding European Application No. 05 25 1374 on Feb. 19, 2007, EPO, Berlin, DE.
(Continued)

*Primary Examiner* — Samir A Ahmed
*Assistant Examiner* — Ali Bayat
(74) *Attorney, Agent, or Firm* — Staas & Halsey LLP

(57) ABSTRACT

A method and apparatus for encoding and/or decoding depth image-based representation (DIBR) data are provided. The encoding method includes: converting 3-dimensional (3D) volume data into adjustable octree data with predetermined labels given to nodes; by referring to the labels, encoding nodes of the adjustable octree from the root node to leaf nodes by a modified breadth-first search (BFS) method allocating priorities among children nodes; and generating a bitstream with predetermined header information and encoded node data. The decoding method includes: extracting header information containing at least resolution information of an object, from a bitstream and decoding the header information; calculating the number of nodes by using the resolution information of the header, and by a modified BFS method allocating priorities among children nodes, decoding each node of a tree from the root node to leaf nodes; and restoring an adjustable tree by using decoded nodes. According to the method and apparatus, a huge amount of 3D volume data can be encoded with a high efficiency, and volume data with an arbitrary resolution as well as volume data with a fixed resolution can be encoded with a high efficiency. Accordingly, with a small amount of data, 3D volume data with a high picture quality can be restored. In addition, since a progressive bitstream is generated, 3D volume data can be shown progressively when decoding is performed.

25 Claims, 17 Drawing Sheets
(3 of 17 Drawing Sheet(s) Filed in Color)

U.S. PATENT DOCUMENTS

| | | | |
|---|---|---|---|
| 6,597,359 | B1 | 7/2003 | Lathrop |
| 7,054,871 | B2* | 5/2006 | Hu et al. .................. 707/100 |
| 2002/0057850 | A1* | 5/2002 | Sirohey et al. ............ 382/299 |
| 2003/0097384 | A1* | 5/2003 | Hu et al. .................. 707/514 |
| 2004/0064475 | A1* | 4/2004 | Maeda et al. ............ 707/103 Y |
| 2007/0230829 | A1* | 10/2007 | Sirohey et al. ............ 382/299 |

FOREIGN PATENT DOCUMENTS

| | | |
|---|---|---|
| JP | 11-234678 | 8/1999 |
| JP | 2001-103493 | 4/2001 |
| JP | 2003-296755 | 10/2003 |
| JP | 2004-005373 | 1/2004 |

OTHER PUBLICATIONS

Song, In-Wook, et al., "*Progressive Compression of PointTexture Images*", Visual Communication and Image Processing 2004, edited by Sethuraman Panchanathan, Bhaskaran Vasudev, Proc. of SPIE-IS&T Electronic Imaging, Jan. 20, 2004, pp. 1159-1168, vol. 5808, No. 1, SPIE, Bellingham, VA, USA.

Park, In Kyu, et al., "*Compression of PointTexture in Depth Image-based Representation (DIBR)*", International Organization for Standardization ISO/IEC JTC1/SC29/WG11, Coding of Moving Pictures and Associated Audio, MPEG2003/M9810, Jul. 20, 2003, pp. 1-11, Trondheim, Norway.

Samet, Hanan, "*Data Structures for Quadtree Approximation and Compression*", Communications of the Association for Computing Machinery, Sep. 1, 1985, pp. 973-993, vol. 28, No. 9, ACM, New York, NY, USA.

Hunter, Andrew, et al., "*Breadth-First Quad Encoding for Networked Picture Browsing*", Computers & Graphics, Jan. 1989, pp. 419-432, vol. 13, No. 4, Pergamon Press Ltd., Oxford, Great Britain.

Bayakovski, Y., et al., "*Depth Image-Based Representations for Static and Animated 3D Objects*", Proceedings 2002 International Conference on Image Processing. ICIP 2002. Rochester NY, Sep. 22-25, 2002, International Conferences on Image Processing. Sep. 22, 2002, pp. 25-28, vol. 2 of 3, IEEE, New York, NY, USA.

Song, I. et al., *Progressive Compression of PointTexture Images*, Proceedings of SPIE-IS&T Electronic Imaging, SPIE vol. 5308, pp. 1159-1168 (10 pp.), Jan. 2004.

Office Action mailed Feb. 13, 2009 in corresponding Chinese Patent Application No. 2005100762542 (36 pp. including translation).

Toriyama Hiroshi, etc., "High-efficiency coding method of 3D object expressed by Octree", The Institute of Television Engineers of Japan Technical Report, Japan, The Institute of Television Engineers of Japan, Jan. 30, 1992, vol. 16, No. 10, pp. 31-36.

Matsuda Ryoji, etc., "Development of Metaball and Voxel Data-Integrated Forming System", Magazine of The Institute of Video Electronic Engineers of Japan, Japan, The Institute of Video Electronic Engineers of Japan, Aug. 25, 1997, 26, 4, pp. 314-324.

Japanese Non-Final Rejection issued Jul. 21, 2010 corresponding to Japanese Patent Application No. 2005-064221.

U.S. Office Action dated Dec. 27, 2010 from copending U.S. Appl. No. 12/662,555, which is a divisional application based on the present application.

* cited by examiner (a)

(b)

(a)        (b)

(c)

(a)  (b)

(c)

(a) depth = k−1    (b) depth = k    (c) context

ADAPTIVE $2^n$-ARY TREE GENERATING METHOD, AND METHOD AND APPARATUS FOR ENCODING AND DECODING 3D VOLUME DATA USING IT

CROSS-REFERENCE TO RELATED PATENT APPLICATIONS

Priority is claimed to U.S. Provisional Patent Application No. 60/550,735, filed on Mar. 8, 2004, and No. 60/586,734, filed on Jul. 12, 2004, in the U.S. Patent and Trademark Office, and Korean Patent Application No. 10-2005-0012424, filed on Feb. 15, 2005, in the Korean Intellectual Property Office, the disclosures of which are incorporated herein in their entirety by reference.

BACKGROUND OF THE INVENTION

1. Field of the Invention

The present invention relates to a 3-dimensional (3D) data encoding and decoding, and more particularly, to a method and apparatus for encoding and/or decoding 3D volume data.

2. Description of the Related Art

Among methods expressing a 3D object, a method using a polygonal mesh model is widely used. Meanwhile, depth image-based representation (DIBR), which was adopted as a standard for MPEG-4 Animation Framework extension (AFX) in 2003, is a method of expressing a 3D object using a set of reference images consisting of real images or synthetic images, instead of the polygonal mesh model. A reference image consists of images seen at surfaces of a hexahedron surrounding a 3D object as shown in FIG. 1. Each reference image includes corresponding color images and depth images. The color images represent colors of respective points on the surface of a 3D object, and the depth images represent distance values to respective points on the surface of the 3D object from corresponding surfaces of the hexahedron. In FIG. 1, total 12 reference images including 6 depth images and 6 color images seen at respective surfaces are shown.

Advantages of the DIBR method lie in that it does not need to use the complicated polygonal mesh model, and a 3D object can be visualized with a high picture quality because it uses images. There are three formats for the DIBR: SimpleTexture, PointTexture, and OctreeImage formats. Among them, PointTexture format expresses a 3D object by arranging all points sampling the 3D object into each scan line on one plane as shown in FIG. 2. Each point of the PointTexture is expressed by a color and a depth. The depth is a distance from the plane to the point. Additionally, the other attributes of the point can be included.

As shown in FIG. 2, since points constituting the surface of a 3D object can be arranged along each depth line of a plane onto which the points have been projected, the PointTexture format is generally formed of a plurality of layers. According to this, the PointTexture format has an advantage that it can express a complicated 3D object formed with multiple faces. However, when a dimensional object should be expressed realistically at a high sampling density, the amount of data becomes huge and a method capable of compressing the data efficiently is needed. In addition, a method for compressing PointTexture format data is needed.

The conventional compression method needs optimization for the amount of information to be transmitted and still the amount can be reduced. When the compressed bitstream is restored, a method for more natural visualization is needed.

In a MPEG meeting held in July, 2003, an octree compression method using a prediction by partial matching method has been suggested for PointTexture compression in the MPEG-4 AFX standard. However, this method cannot smoothly visualize images when reading progressive bitstreams and restoring images. Also, since this method uses the octree compression method, there is a drawback that in relation to the resolution of volume data, only data with a fixed resolution in which the values of the width, height, and depth should be identical can be compressed. That is, data having an arbitrary resolution in which the values of the width, height, and depth are different to each other cannot be compressed.

Accordingly, a method capable of progressive transmission and more natural visualization in restoration, as well as effective compression of 3D object data having an arbitrary resolution is needed.

SUMMARY OF THE INVENTION

Exemplary embodiments of the present invention provides an adjustable quad tree, octree, and $2^n$-ary tree generation method of generating the trees to encode 3D volume data having an arbitrary resolution.

Exemplary embodiments of present invention also provides a 3D volume data encoding method and apparatus enabling a function capable of efficiently encoding 3D volume data, and encoding 3D volume data having an arbitrary resolution, and enabling progressive coding.

Exemplary embodiments of the present invention also provides a 3D volume data decoding method and apparatus enabling a function capable of decoding 3D volume data having an arbitrary resolution irrespective of the resolution of 3D volume data, and enabling restoration from progressive coding, by using an adjustable octree.

According to an aspect of the present invention, there is provided an adjustable quad tree generation method including: dividing 2-dimensional (2D) data into a quad tree consisting of 4 regions; and dividing each node of the data divided into the quad tree, into sub quad trees until the size of the node becomes one pixel, wherein for the quad tree division in the dividing of the 2D data and the dividing of each node into sub quad trees, when the number of pixels of each of the width and length of the 2D data is an even number, the 2D data is divided into two halves, and when the number is an odd number, the 2D data is divided so that the difference of the divided parts is one pixel, and if each of the 4 divided regions does not become 4 pixels, a virtual pixel is added such that the region is generated to have 4 pixels, and the division of the 2D data for the divided parts to have one pixel difference is performed such that when the data is divided into the left-hand side and the right-hand side, any one of the left-hand side and the right-hand side is always one pixel more than the other side, and when the data is divided into the top side and the bottom side, any one of the top side and the bottom side is always one pixel more than the other side.

According to another aspect of the present invention, there is provided an adjustable octree generation method including: dividing 3-dimensional (3D) data into an octree consisting of 8 regions; and dividing each node of the data divided into the octree, into sub octrees until the size of the node becomes one voxel, wherein for the octree division in the dividing of the 3D data and the dividing of each node into sub octrees, when the number of voxels of each of the width, length, and height of the 3D data is an even number, the 3D data is divided into two halves, and when the number is an odd number, the 3D data is divided so that the difference of the divided parts is one voxel, and if each of the 8 divided regions does not become 8 voxels, a virtual voxel is added such that the region is generated to have 8 voxels, and the division of the 3D data for the divided parts to have one voxel difference is performed such that in each of front-back direction, left-right direction, and top-bottom direction, any one of the two divided parts is always one voxel more than the other part.

According to still another aspect of the present invention, there is provided an adjustable $2^n$-ary tree generation method including: dividing n-dimensional (nD) data into a $2^n$-ary tree consisting of $2^n$ regions; and dividing each node of the data divided into the $2^n$-ary, into sub octrees until the size of the node becomes one unit part, wherein for the $2^n$-ary tree division in the dividing of the nD data and the dividing of each node into sub $2^n$-ary trees, when the number of unit parts in each direction of the nD data is an even number, the nD data is divided into two halves, and when the number is an odd number, the nD data is divided so that the difference of the divided parts is one unit part, and if each of the $2^n$ divided regions does not become $2^n$ unit parts, a virtual unit part is added such that the region is generated to have $2^n$ unit parts, and the division of the nD data for the divided parts to have one unit part difference is performed such that in each direction, any one divided part is always one unit part more than the other part.

According to yet still another aspect of the present invention, there is provided a 3D volume data encoding method including: converting 3D volume data into adjustable octree data with predetermined labels given to nodes; by referring to the labels, encoding nodes of the adjustable octree from the root node to leaf nodes by a modified breadth-first search (BFS) method allocating priorities among children nodes; and generating a bitstream with predetermined header information and encoded node data.

The converting of the 3D volume data may include: if the 3D volume data is PointTexture data, converting into voxel data by using a 3D bounding volume; and converting the voxel data or octree data into an adjustable octree with predetermined labels given to nodes.

The converting into the adjustable octree with predetermined labels given to nodes may include: dividing the 3D data into 8 regions and generating an octree;
and while giving a predetermined label to each node of the octree, dividing a 3D region indicated by each node of the octree, into 8 regions, and if the number of children nodes is not 8, adding a virtual voxel to make the number 8, and in a case (W) where all voxels in a lower layer forming a 3D region indicated by a node are formed of voxels having no object, and in a case (B) where voxels in a lower layer forming a 3D region indicated by a node are formed of voxels having an object, preliminarily regarding all the voxels in the lower layer as volexs having an object and defining the node regarding the voxels is an S-node or P-node in DIB information, wherein for the division, when the number of voxels in each of the width, height, and depth of the 3D data is an even number, the 3D data is divided into two halves, and if the number is an odd number, the 3D data is divided such that two divided parts have one voxel difference, and the division is performed in a regular direction such that in each of the front-back, left-right, and top-bottom directions, any one divided part is always one voxel more than the other divided part.

When the 3D data is expressed by an octree and a 3D region indicated by each node of the octree is referred to as a node region, the predetermined labels may distinguish the following cases: a case (W) of a node in which voxels in a lower layer of the node region are formed all with voxels having no object; a case (B) of a node in which voxels in a lower layer of the node region are formed of voxels having an object; a case (P) of a node in which the values of voxels in a lower layer of the node region are encoded by a prediction by partial matching (PPM) algorithm; a case (S) of a node having a sub node marked by a label; and a case (E) of a virtual voxel added to make the number of children nodes 8 when the number is not 8.

A node having the label 'E' may not be encoded.

The encoding of the node data of the octree may include: by selecting whether the encoding is S node encoding or P node encoding, generating encoding type information (SOP); if the encoding type information is S node encoding, encoding detailed information of an S node; and if the encoding type information is P node encoding, encoding detailed information of a P node.

The S node detailed information may include: a mean value of color information of children nodes; and flag information (Ch1-Ch8) indicating the presence of children nodes. The mean value of color information may be differential pulse code modulation (DPCM) encoded and entropy-encoded. The flag information may be entropy-encoded.

The P node detailed information may include: color information of voxels of a corresponding node; and depth information of voxels of the node by using a predetermined number of contexts. The color information may be DPCM encoded and entropy-encoded. The depth information may be PPM encoded.

The bitstream may include: a header containing resolution information including the width, height, and depth information of a 3D object; and encoded node data of the octree. The header may further include: decoding percent information (PercentOfDecoding) indicating lossless encoding to encode all nodes from the root node to the last node when nodes are encoded, and lossy encoding to encode from a start node to a predetermined node. The header may further include: version information of depth image-based representation data.

According to a further aspect of the present invention, there is provided a 3D volume data encoding apparatus including: an adjustable octree conversion unit converting voxel data or octree data into adjustable octree data with predetermined labels given to nodes; a node encoding unit encoding nodes of the adjustable octree from the root node to leaf nodes by a modified breadth-first search (BFS) method allocating priorities among children nodes, by referring to the labels; and a bitstream generating unit generating a bitstream with predetermined header information and the encoded node data.

If the 3D volume data is PointTexture data, the apparatus may further include a voxel generation unit converting into voxel data by using a 3D bounding volume.

The adjustable octree conversion unit may include: an octree generation unit dividing the 3D data into 8 regions and generating an octree; and an adjustable octree generation unit giving a predetermined label to each node of the octree, while dividing a 3D region indicated by each node of the octree, into 8 regions, and if the number of children nodes is not 8, adding a virtual voxel to make the number 8, and in a case (W) where voxels in a lower layer forming a 3D region indicated by a node are formed of voxels having no object, and in a case (B) where voxels in a lower layer forming a 3D region indicated by a node are formed of voxels having an object, preliminarily regarding all the voxels in the lower layer as volexs having an object and defining the node regarding the voxels is an S-node or P-node in DIB information, wherein for the division, when the number of voxels in each of the width, height, and depth of the 3D data is an even number, the 3D data is divided into two halves, and if the number is an odd number, the 3D data is divided such that two divided parts have one voxel difference, and the division is performed in a regular direction such that in each of the front-back, left-right, and top-bottom directions, any one divided part is always one voxel more than the other divided part.

When the 3D data is expressed by an octree and a 3D region indicated by each node of the octree is referred to as a node region, the predetermined labels may distinguish the following cases: a case (W) of a node in which voxels in a lower layer of the node region are formed all with voxels having no object; a case (B) of a node in which voxels in a lower layer of the node region are formed all with voxels having an object; a case (P) of a node in which the values of voxels in a lower layer of the node region are encoded by a prediction by partial matching (PPM) algorithm; a case (S) of a node having a sub node marked by a label; and a case (E) of a virtual voxel added to make the number of children nodes 8 when the number is not 8. A node having the label 'E' may not be encoded.

The node encoding unit may include: an SOP information selection unit generating encoding type information (SOP) by selecting whether the encoding is S node encoding or P node encoding; an S node encoding unit encoding detailed information of an S node if the encoding type information is S node encoding; and a P node encoding unit encoding detailed information of a P node if the encoding type information is P node encoding. The S node encoding unit may encode: a mean value of color information of children nodes; and flag information (Ch1-Ch8) indicating whether children nodes exist or not. The mean value of color information may be differential pulse code modulation (DPCM) encoded and entropy-encoded. The flag information may be entropy-encoded. The P node encoding unit may encode: color information of voxels of a corresponding node; and depth information of voxels of the node by using a predetermined number of contexts. The color information may be DPCM encoded and entropy-encoded. The depth information may be PPM encoded.

The bitstream generating unit may generate: a header containing resolution information including the width, height, and depth information of a 3D object; and encoded node data of the octree. The header may further include: decoding percent information (PercentOfDecoding) indicating lossless encoding to encode all nodes from the root node to the last node when nodes are encoded, and lossy encoding to encode from a start node to a predetermined node. The header may further include: version information of depth image-based representation data.

According to an additional aspect of the present invention, there is provided a depth image-based representation data decoding method including: extracting header information containing at least resolution information of an object, from a bitstream and decoding the header information; calculating the number of nodes by using the resolution information of the header, and by a modified BFS method allocating priorities among children nodes, decoding each node of a tree from the root node to leaf nodes; and restoring an adjustable tree by using decoded nodes.

The resolution information in the extracting header information may include width, height, and depth data of a 3D object.

The extracting and decoding of the header information may further include: extracting decoding percent information (PercentOfDecoding) indicating a lossy decoding degree to decode from the root node to a predetermined node when a node is decoded and lossless decoding to decode all nodes from the root node to the last node, and decoding the information.

In the extracting and decoding of the header information, header information including at least resolution information of an object and version information of depth image-based representation data may be extracted from the bitstream and decoded. In the calculating of the number of nodes and the decoding of each node, by using the number of nodes calculated by using the resolution information and the decoding percent information, the number of nodes to be decoded may be calculated, and by the modified BFS method allocating priorities among children nodes, in the leaf nodes direction beginning from the root node, the same number of tree nodes as the number of the nodes to be decoded may be decoded. By using a priority queue, the modified BFS method may be performed by pushing the index of a node to be decoded in the priority queue and popping up the index from the queue.

With respect to the priorities, the priority of a first child node of a node may be higher than that of a second child node, the priority of the second child node may be higher than that of a third child node, and in the same manner, the last node may have the lowest priority.

The decoding of the tree node may include: decoding encoding type information (SOP) indicating whether the tree node is encoded by S node encoding or P node encoding; if the SOP indicates the S node encoding, determining that the node desired to be decoded is an S node, and decoding the S node; and if the SOP indicates the P node encoding, determining that the node desired to be decoded is a P node, and decoding the P node.

The S node decoding may include: entropy-decoding the color information of the S node; determining whether the label of a node is W or B in each of the children nodes of the S node; if the label of the child node is W, calculating the number of sub tree nodes and skipping decoding on as many children nodes as the sub tree nodes; and if the label of the child node is B, pushing the index of the child node in the priority queue. The P node decoding may include: calculating a 3D volume region including width, height, and depth data, from the index of a tree node; and checking whether or not there is a voxel in the volume region, and if there is a voxel, entropy-decoding the color information of the voxel.

The decoding method may further include converting the restored adjustable tree data into voxel data.

According to an additional aspect of the present invention, there is provided a 3D volume data decoding apparatus include: a header decoding unit extracting header information containing at least resolution information of an object, from a bitstream and decoding the header information; a node decoding unit calculating the number of nodes by using the resolution information of the header, and by a modified BFS method allocating priorities among children nodes, decoding each node of a tree from the root node to leaf nodes; and an adjustable tree restoration unit restoring an adjustable tree by using decoded nodes.

The resolution information in the extracting header information may include width, height, and depth data of a 3D object. When the header further includes decoding percent information (PercentOfDecoding) indicating a lossy decoding degree to decode from the root node to a predetermined node when a node is decoded and lossless decoding to decode all nodes from the root node to the last node, the header decoding unit may extract the decoding percent information from the bitstream and decodes the information. The header decoding unit may extract header information including at least resolution information of an object and version information of depth image-based representation data, from the bitstream and decode the header information.

By using the number of nodes calculated by using the resolution information and the decoding percent information, the node decoding unit may calculate the number of nodes to be decoded, and by the modified BFS method allocating priorities among children nodes, in the leaf nodes direction beginning from the root node, decode the same number of tree nodes as the number of the nodes to be decoded. By using a priority queue, the modified BFS method may be performed by pushing the index of a node to be decoded in the priority queue and popping up the index from the queue. With respect to the priorities, the priority of a first child node of a node may be higher than that of a second child node, the priority of the second child node may be higher than that of a third child node, and in the same manner, he last node may have the lowest priority.

The node decoding unit may include: an SOP restoration unit extracting and restoring encoding type information (SOP) indicating whether the tree node is encoded by S node encoding or P node encoding; an S node decoding unit, if the SOP indicates the S node encoding, determining that the node desired to be decoded is an S node, and decoding the S node; and a P node decoding unit, if the SOP indicates the P node encoding, determining that the node desired to be decoded is a P node, and decoding the P node. The S node decoding unit may include: a color information decoding unit entropy-decoding the color information of the S node; a WOB determination unit determining whether the label of a node is W or B in each of the children nodes of the S node; a W node processing unit, if the label of the child node is W, calculating the number of sub tree nodes and skipping decoding on as many children nodes as the sub tree nodes; and a B node processing unit, if the label of the child node is B, pushing the index of the child node in the priority queue. The P node decoding unit may include: a voxel PPM decoding unit calculating a 3D volume region represented by width, height, and depth data using the index of a tree node, and checking whether or not there is a voxel in the volume region; a voxel color decoding unit, if there is a voxel, entropy-decoding the color information of the voxel.

The decoding apparatus may further include: a voxel data restoration unit restoring voxel data by using the restored adjustable tree.

A computer readable recording medium having embodied thereon a computer program for the methods can be provided.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The above and other features and advantages of the present invention will become more apparent by describing in detail exemplary embodiments thereof with reference to the attached drawings in which.

DETAILED DESCRIPTION OF THE INVENTION

Hereinafter, a method and apparatus for encoding and/or decoding 3D volume data including any one of PointTexture, voxel, and octree data, according to exemplary embodiments of the present invention will now be described more fully with reference to the accompanying drawings, in which exemplary embodiments of the invention are shown.

First, an adjustable $2^n$-ary tree generation method according to exemplary embodiments of the present invention will now be explained. N-dimensional data is divided into a $2^n$-ary tree consisting of $2^n$ regions. Then, each node of the data divided into the $2^n$-ary tree is divided into a lower layer $2^n$-ary tree until the size of the node becomes one unit part. For the $2^n$-ary tree division, if the number of unit parts in each direction of the N-dimensional data is an even number, the $2^n$-ary tree is divided into two halves, and if the number is an odd number, the $2^n$-ary tree is divided so that one divided part is one unit part greater than the other divided part. At this time, if each of $2^n$ divided regions does not become $2^n$ unit parts, a virtual unit part is added to make the region $2^n$ unit parts. The division in each direction where there is one unit part difference between two divided parts is performed in a predetermined direction such that only one side is always one unit part greater than the other side in each direction.

As an example of the adjustable $2^n$-ary tree generation method, a case where n=3, that is, an adjustable octree, will now be explained. In order to generate an adjustable octree, first, 3D data is divided into an octree consisting of 8 regions. Each node of the data divided into the octree is divided again into a lower layer octree until the size of a node becomes one unit part, that is, one voxel. In the octree division, if the number of voxels of each of the width, height, and depth of the 3D data is an even number, the octree is divided into two halves, and if it is an odd number, the octree is divided so that one divided part is one voxel longer than the other divided part. At this time, if each of the 8 divided regions does not become 8 voxels, a virtual voxel is added in order to make the region 8 voxels. The division in each of front-back, left-right, and up-down directions in which there is one voxel difference between two divided parts is performed in a predetermined direction such that only one side is always one voxel longer than the other side in each direction.

Figure 1:
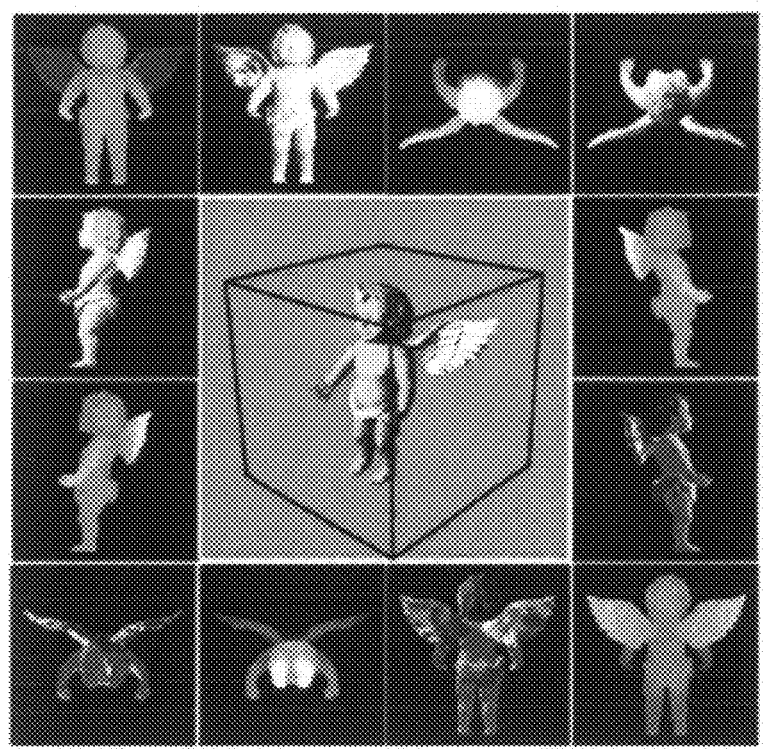
FIG. 1 illustrates reference images shown in respective surfaces of a hexahedron surrounding a 3D object.
Figure 2:
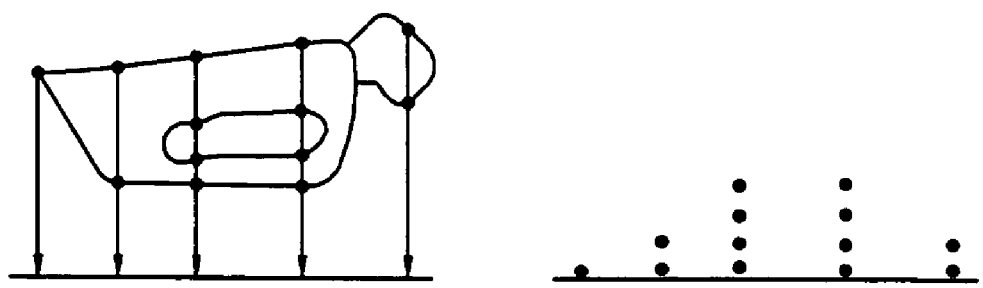
FIG. 2 illustrates points forming surfaces of a 3D object, the points arranged along respective lines of a plane.
Figure 3:
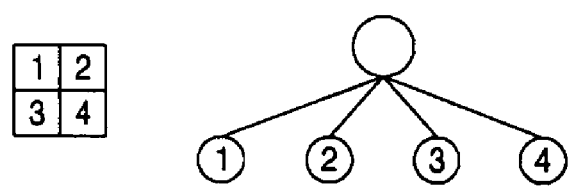
FIG. 3 illustrates parent-children relations in a tree structure.
Figure 3:
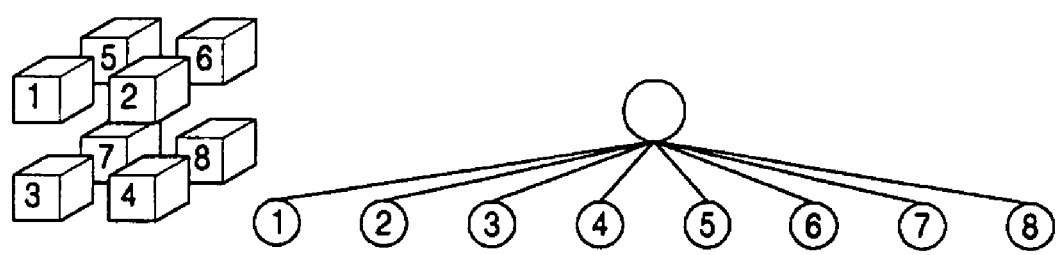

FIG. 3 illustrates parent-children relations in a tree structure. FIG. 3(A) shows an example of quad tree and FIG. 3(B) shows an example of octree. An octree has 8 children nodes from one root node, and each of the children nodes can have another 8 children nodes or leaf nodes.

The generation of the adjustable octree will now be explained. The adjustable octree has 8 children nodes from the root node, and each of the children nodes can have another 8 children nodes in a lower layer or leaf nodes. To these nodes, 5 types of labels are attached.

The adjustable octree has a structure similar to that of an ordinary octree, but is different from the ordinary octree in that labels are attached to intermediate nodes. The 5 labels are defined as S node (Split), P node (PPM), B node (Black), W node (White), and E node (Empty).

Assuming that a 3D region represented by each node of the octree is referred to as a node region, if a node region is formed of lower layer voxels having no object, the node is referred to as a W node, and if a node region is formed of lower layer voxels all having an object, the node is referred to as a B node. If the values of lower layer voxels in a node region are encoded by a PPM algorithm, the node is referred to as a P node, and if a node region has a sub node marked by a label, the node is referred to as an S node. If there is a virtual voxel added in order to make the number of children nodes 8 when the number is not 8, the node is referred to as an E node. Table 1 shows 5 types of labels of the octree nodes.

TABLE 1

| Labels | Explanation |
| --- | --- |
| S | Split: The node is divided into 8 sub nodes. |
| P | PPM: Voxels in the node are encoded by the PPM algorithm. |
| W | White: The node does not include voxels. |
| B | Fill black: All or almost all parts of the node are filled with voxels. |
| E | Empty: The node has no space to include voxels. |

If a bounding volume for a 3D object includes an object, the root node is expressed as an S node and the volume is subdivided into 8 sub volumes. If the subdivided volume includes only white voxels, the corresponding node is expressed as a W node, and if the subdivided volume includes at least one black voxel, the corresponding node is preliminarily expressed as a B node. If the subdivided volume does not include only white voxels or is not PPM-coded, the node is expressed as an S node. That is, if a node has a children node whose node is expressed by labels such as S, W, B, P, and E, the label of the node is set to S. The volume of the S node is again subdivided into 8 smaller volumes. This process is repeated until the tree arrives at a predetermined depth. In this depth, if it is efficient to encode a predetermined node in a PPM method, the label is set to P.

Meanwhile, when a bounding volume is divided into 8 volumes, if the length in one axis cannot be divided into two parts of an identical size, the volume is divided regularly such that one divided part is one voxel longer than the other divided part. However, if there is no space for a voxel in the other part, that is, in the part that is one voxel shorter, for example, if the number of voxels in the lower layer is not 8 in an octree, an empty space is determined and an empty node is defined as an empty voxel and the label of the empty node is marked as an E node. Even when a node includes an E node and formed of only B nodes and W nodes, the node can be treated as a P node, and the voxel values can be encoded by the PPM method.

Figure 4:
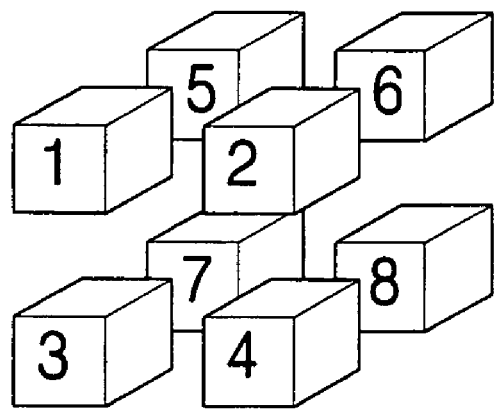
FIG. 4 illustrates an example of dividing a parent node into 8 children nodes having the same size in case of an octree.

In case of an octree, a parent node is divided into 8 children nodes of an identical size if possible. The order of dividing a parent node can be determined as front left-top, front right-top, front left-bottom, front right-bottom, back left-top, back right-top, back left-bottom, back right-bottom, as shown in FIG. 4.

For clearer explanation, the above method will now be explained with a specific example using a quad tree.

Figure 5:
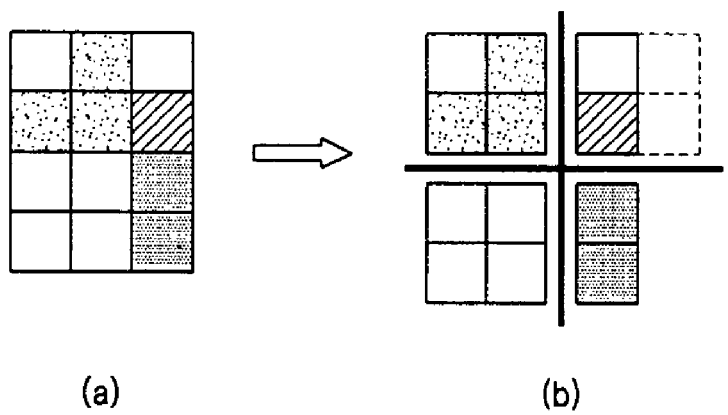
FIGS. 5 and 6 illustrate adjustable quad trees in order to explain the concept of an adjustable octree more easily.
Figure 5:
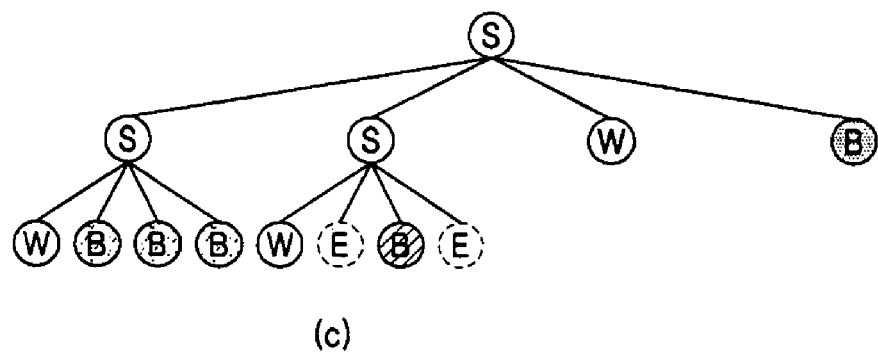
Figure 6:
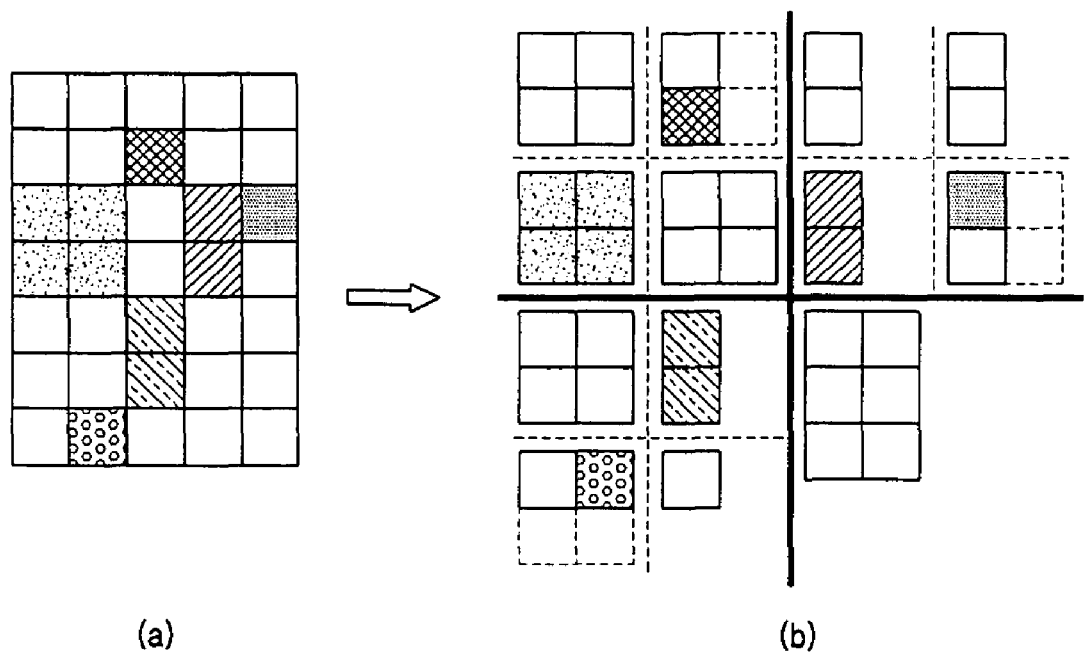
Figure 6:
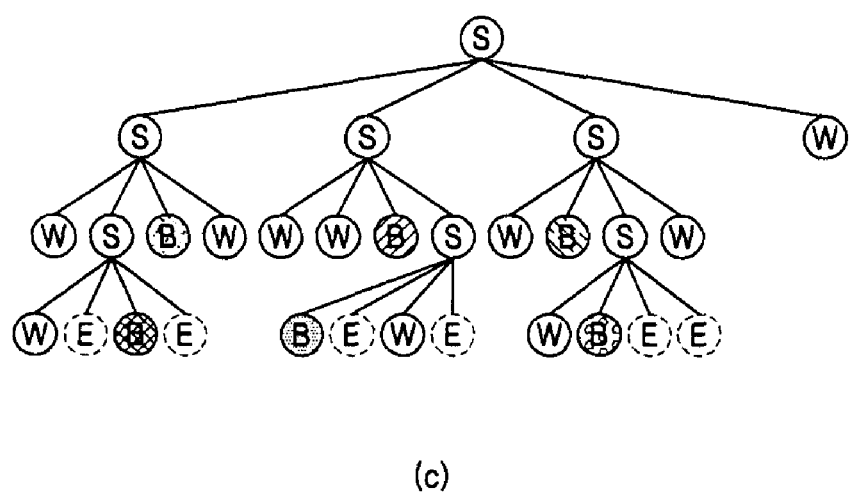

FIGS. 5 and 6 illustrate adjustable quad trees in order to explain the concept of an adjustable octree more easily. FIG. 5(A) is a 2D image with a width of 3 and a height of 4 and shows a quad tree for a 2D image with a 3×4 resolution. A white pixel (point) having no color indicates an empty pixel and a voxel with a color indicates a full voxel. A node with a color in FIG. 5(C) corresponds to a voxel with the same color in FIG. 5(A).

When 4 sub nodes are divided from the root node, since the width is 3, the division is performed such that one divided part is 2 and the other divided part is 1. Since the height is 4, each divided part is 2. The reason why the root node is S in the adjustable quad tree of FIG. 5(C) is that the sub nodes include objects. The 4 immediate sub nodes of the root node are S, S, W, and B nodes. The reason why the first and second nodes are S nodes is that pixel information is expressed by children nodes in a lower layer. The children nodes of the first S node are W, B, B, and B nodes and correspond to 4 pixel regions on the top left-hand corner of FIG. 5(B). The children nodes of the second S node are W, E, B, and E nodes and correspond to 4 pixel regions on the top right-hand corner of FIG. 5(B). The B node indicates that the pixel is full and the W node indicates that the node is empty. Information that is the object of encoding is a pixel expressed as a B node and a W node. The E node indicates that there is no space for a pixel, and is information that is not included as an object of encoding. Accordingly, the E node is a virtual node whose location can be identified by using resolution information of the entire bounding volume. The 2 pixels expressed by dotted lines among the 4 pixels on the top right-hand corner of FIG. 5(B) are E nodes, and indicate a region that is originally not in FIG. 5(A). The reason why the virtual E node is thus expressed is to make the first S node a virtual quad tree as if the S node has 4 children nodes.

Likewise, also in an adjustable octree, when 8 children nodes in a lower layer are expressed in an S node, if a children node has a space for a voxel, the node is expressed as a B node or a W node, and if a children node has no space for a voxel, the node is expressed as an E node. When a space is divided into 8 children nodes in a lower layer, as in the adjustable quad tree, division is performed regularly such that one divided side is one voxel longer than the other divided side. That is, when a 3D volume space is expressed by 3 axes, X, Y, and Z, −X side, −Y side, and −Z side is allocated one voxel more than +X side, +Y side, and +Z side, respectively. The reverse case is also possible, but in the present embodiment, the former rule is used and an identical rule is applied to all nodes.

In FIG. 5(C), the W node that is the third child node of the root node corresponds to the 4 pixel regions at the bottom left-hand corner of FIG. 5(B), and since all pixels are empty, it is expressed as a W node. The B node that is the fourth child node of the root node in FIG. 5(C) corresponds to the 4 pixel regions at the bottom right-hand corner of FIG. 5(B), and since all pixels are full except the virtual E node, it is expressed as a B node. FIG. 6 also shows an example of an adjustable tree and FIG. 6(A) illustrates a 2D image with a 5×7 resolution. In FIG. 6(B), in X axis, the regions are divided into a 3-column point length and a 2-column point length and in Y axis, the regions are divided into a 4-row point length and a 3-row point length. The rows and columns of the divided part that is 1 point length shorter than the other divided part are determined as a region that can be filled with an E node. By using this method, unlike the conventional method, 3D object data having an arbitrary resolution such as 352×288×15, and 123×456×512, can be formed as an adjustable octree. FIG. 6(C) illustrates an adjustable quad tree corresponding to FIG. 6(A).

Figure 7A:
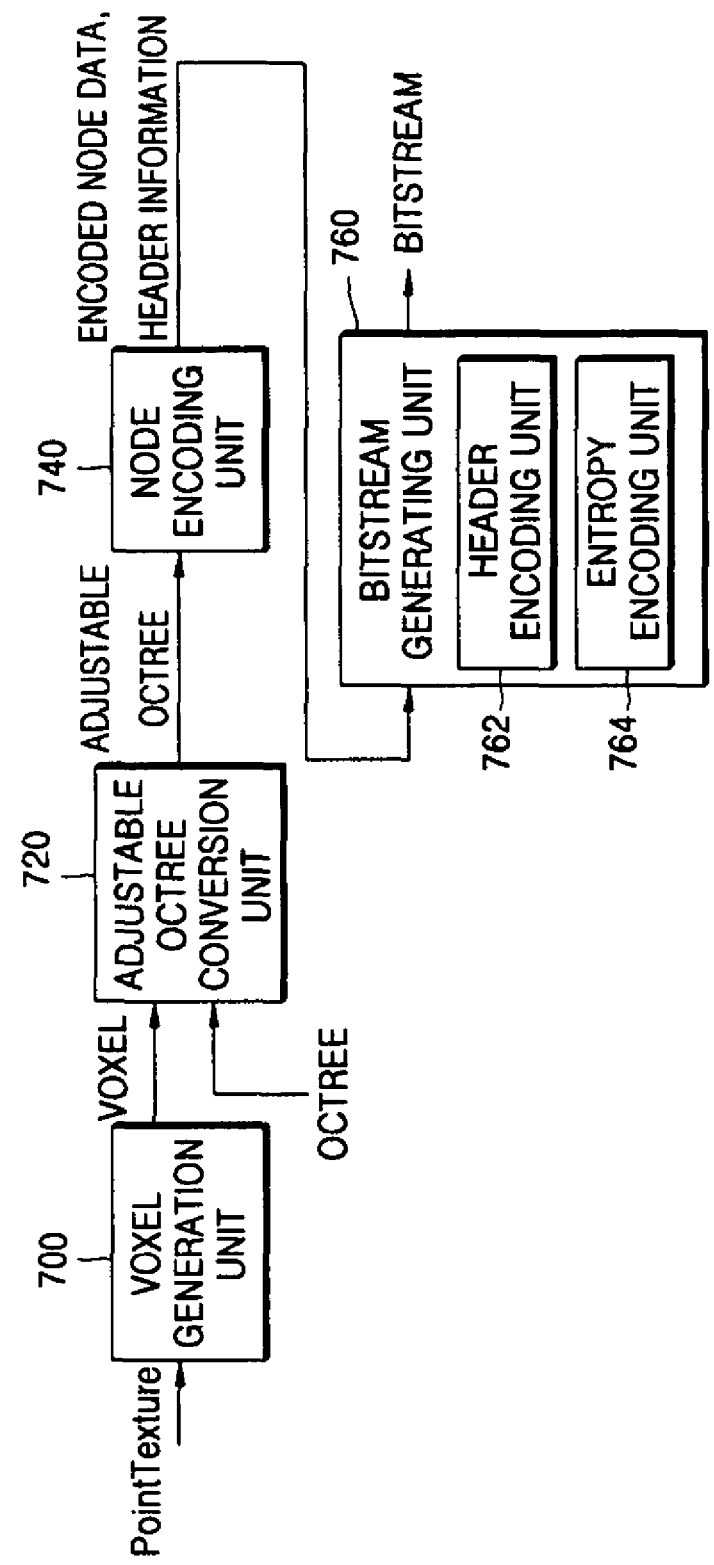
FIG. 7A is a block diagram of the structure of a 3D object data encoding apparatus according to an embodiment of the present invention.
Figure 7B:
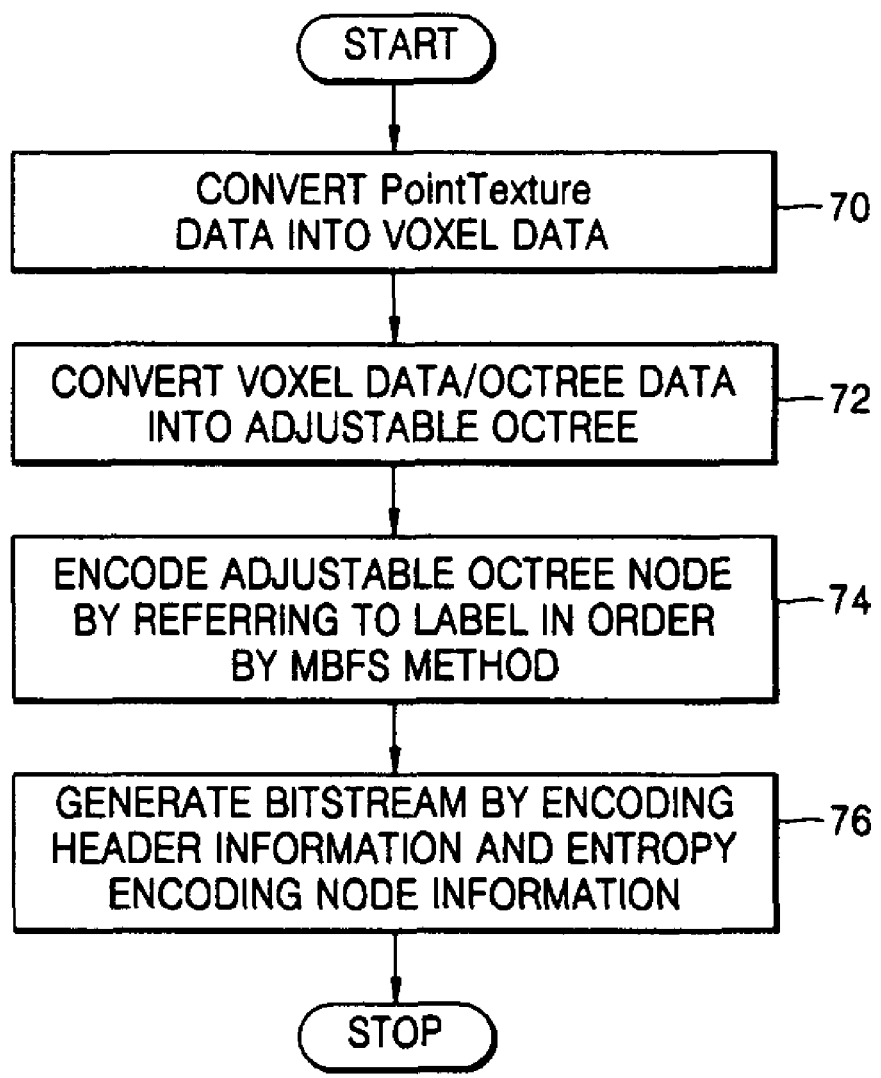
FIG. 7B is a flowchart of the operations performed by a 3D object data encoding method according to an embodiment of the present invention.

Next, by using the adjustable octree generation method described above, a 3D object data encoding apparatus and method according to exemplary embodiments of the present invention will now be explained. FIG. 7A is a block diagram of the structure of a 3D object data encoding apparatus according to exemplary embodiments of the present invention that includes a voxel generation unit 700, an adjustable octree conversion unit 720, a node encoding unit 740, and a bitstream generating unit 760. FIG. 7B is a flowchart of the operations performed by a 3D object data encoding method according to exemplary embodiments of the present invention.

The voxel generation unit 700, if the 3D object data is PointTexture, converts the PointTexture into voxel data by using a 3D bounding volume.

PointTexture format adopted as a standard by the MPEG-4 AFX is as follows:

```
PointTexture {
    field   SFInt32   width        512 // width
    field   SFInt32   height       512 // height
    field   MFInt32   depth [ ]       // depth
    field   MFColor   color [ ]       // color
    field   SFInt32   depthNbBits    7
        // depth resolution information = 2^{depthNbBits+1}
```

If PointTexture data is input, the data is converted into voxel data by the voxel data generation unit 700 in operation 70. In order to convert the depth information of PointTexture, first, a bounding volume is generated. The bounding volume has the same resolution as that of the PointTexture. For example, if the PointTexture has an image of an X×Y resolution and the resolution of the depth information of each pixel is Z, an X×Y×Z bounding volume is generated. The origin of the bounding volume is positioned at the lower left front corner. A voxel on the right-hand side has an x value greater than a left-hand side voxel, and a voxel on the top side has a y value greater than a bottom side voxel, and a rear voxel has a z value greater than a front voxel. All voxels in the volume data are initialized as White(0). Then, a voxel is set to Black (1) if the position of the voxel is full according to a voxel in PointTexture.

An octree has 8 children nodes from the root node, and each child node can have another 8 children nodes in a lower layer or leaf nodes. A node can have a Black or White value, and if the leaf node is Black, it indicates that the voxel is full, and if the leaf node is White, it indicates that the voxel is empty. If an intermediate node, not a leaf node, is Black, it indicates that there is a lower layer node having a full voxel, and if the intermediate node is White, it indicates that all lower layers are empty. This octree is a typical structure used to express 3D volume data.

The adjustable octree conversion unit 720 converts the volume data or octree data into an adjustable octree having predetermined labels given to nodes. With an input of a voxel converted by the voxel generation unit 700 from 3D object data expressed as PointTexture, or with an input of octree data as is, an adjustable octree is generated in operation 72.

Figure 8:
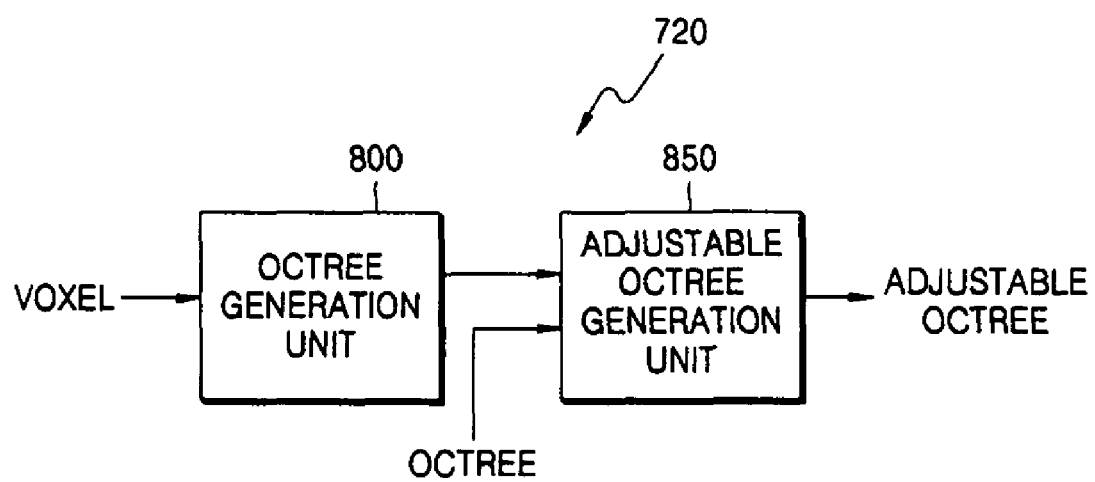
FIG. 8 is a block diagram of a detailed structure of an adjustable octree conversion unit.

FIG. 8 is a block diagram of a detailed structure of the adjustable octree conversion unit 720 that includes an octree generation unit 800 and an adjustable octree generation unit 850.

The octree generation unit 800 receives and divides 3D voxel data into 8 regions and generates an octree. The adjustable octree generation unit 850 allocates a predetermined label to each node of the octree and divides into 8 regions until the size of the node is one voxel, such that an octree with predetermined labels allocated is generated. At this time, in the case of a W node, octree generation through division into 8 lower layer regions of voxels is stopped.

In the 8 region division, if the number of voxels of each of the width, height, and depth of the 3D data is an even number, it is divided into two halves, and if the number is an odd number, the division is performed so that there is one voxel difference between the divided parts. If each of the 8 divided regions does not become 8 voxels, a virtual voxel is added to make the region 8 voxels. The division of each of front-back, left-right, and top-bottom directions in which there is one voxel difference is performed in a predetermined direction such that only one divided side of each of the front-back, left-right and top-bottom directions is always one voxel longer. Detailed explanation of the adjustable octree is the same as explained above on the adjustable octree generation method according to exemplary embodiments of the present invention and it will be omitted here.

The node encoding unit 740 encodes the nodes of the adjustable octree generated in the adjustable octree conversion unit 720 by referring to the label of the node in operation 74. When node encoding is performed in the node encoding unit 740, the encoding order of nodes is determined by using a modified breadth first search (hereinafter referred to as the MBFS).

Figure 9:
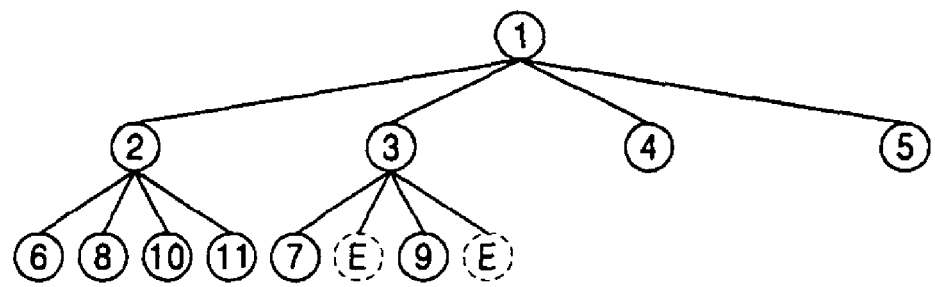
FIG. 9 illustrates a node visit order for encoding nodes of the quad tree shown in FIG. 5(C)
Figure 10:
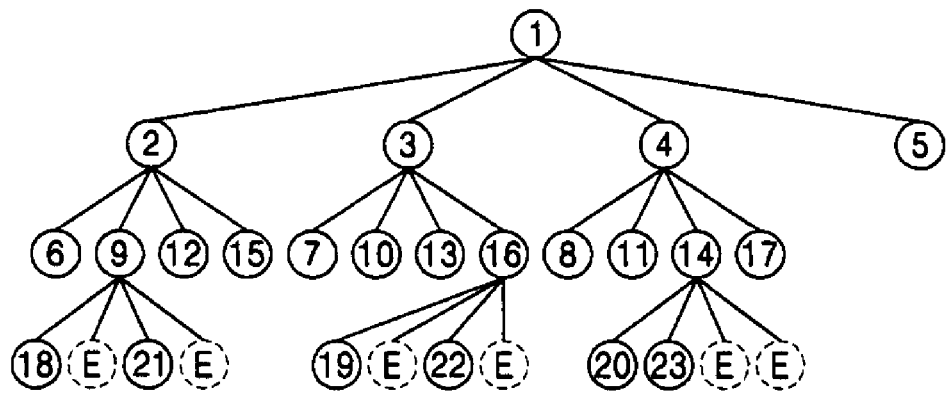
FIG. 10 illustrates a node visit order for encoding nodes of the quad tree shown in FIG. 6(C)

In the encoding using the MBFS, encoding is performed by the BFS method from the root node to the leaf nodes in a top-down method by referring to the label of the node in the adjustable octree structure, and among children nodes, priorities are given and according to the priorities, encoding is performed. Here, a node with an E label is not encoded. According to the MBFS method, in the nodes of the quad tree shown in FIG. 5(C), nodes are visited in order shown in FIG. 9, and according to this order, each node is encoded. That is, among the children nodes, priorities are given and here, a left-hand side node is made to have a higher priority among children nodes. Also, the E node is not visited. Likewise, the nodes of the quad tree shown in FIG. 6(C) are encoded in order shown in FIG. 10.

Figure 11:
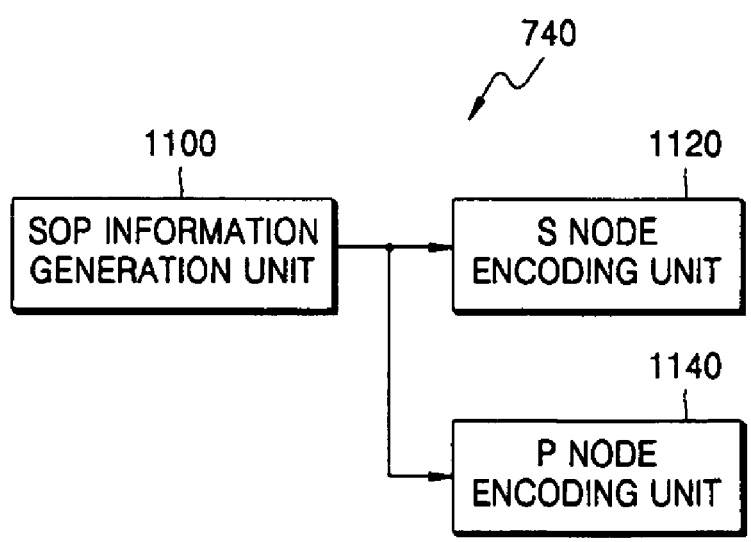
FIG. 11 is a block diagram of a detailed structure of a node encoding unit.

The node encoding unit 740 includes an SOP information generation unit 1100, an S node encoding unit 1120, and a P node encoding unit 1140 as shown in FIG. 11.

The SOP information generation unit 1100 selects whether a node determined by the MBFS method is encoded as an S node or a P node, and generates the encoding type information (SOP). That is, the SOP information generation unit 1100 determines whether a node to be encoded is encoded as an S node or a P node. Each of the entropy when the node is encoded as an S node and the entropy when it is encoded as a P node is calculated and a case with the smaller entropy is selected, and then, the label of the selected S or P node is adaptive arithmetic coding (AAC)-coded.

The S node encoding unit 1120 performs Split node encoding. That is, the S node encoding unit 1120 encodes flag information (Ch1-Ch8) indicating the color information mean value of children nodes and the presence of children nodes. That is, the mean value of the color information of the S node to be encoded is calculated and then, encoded by differential pulse code modulation (DPCM) and entropy-encoding, and more preferably, by AAC encoding. Also, the flag information of the S node to be encoded is entropy-encoded. Here, when necessary, at least one of the DPCM and the entropy-encoding can be omitted.

Figure 12:
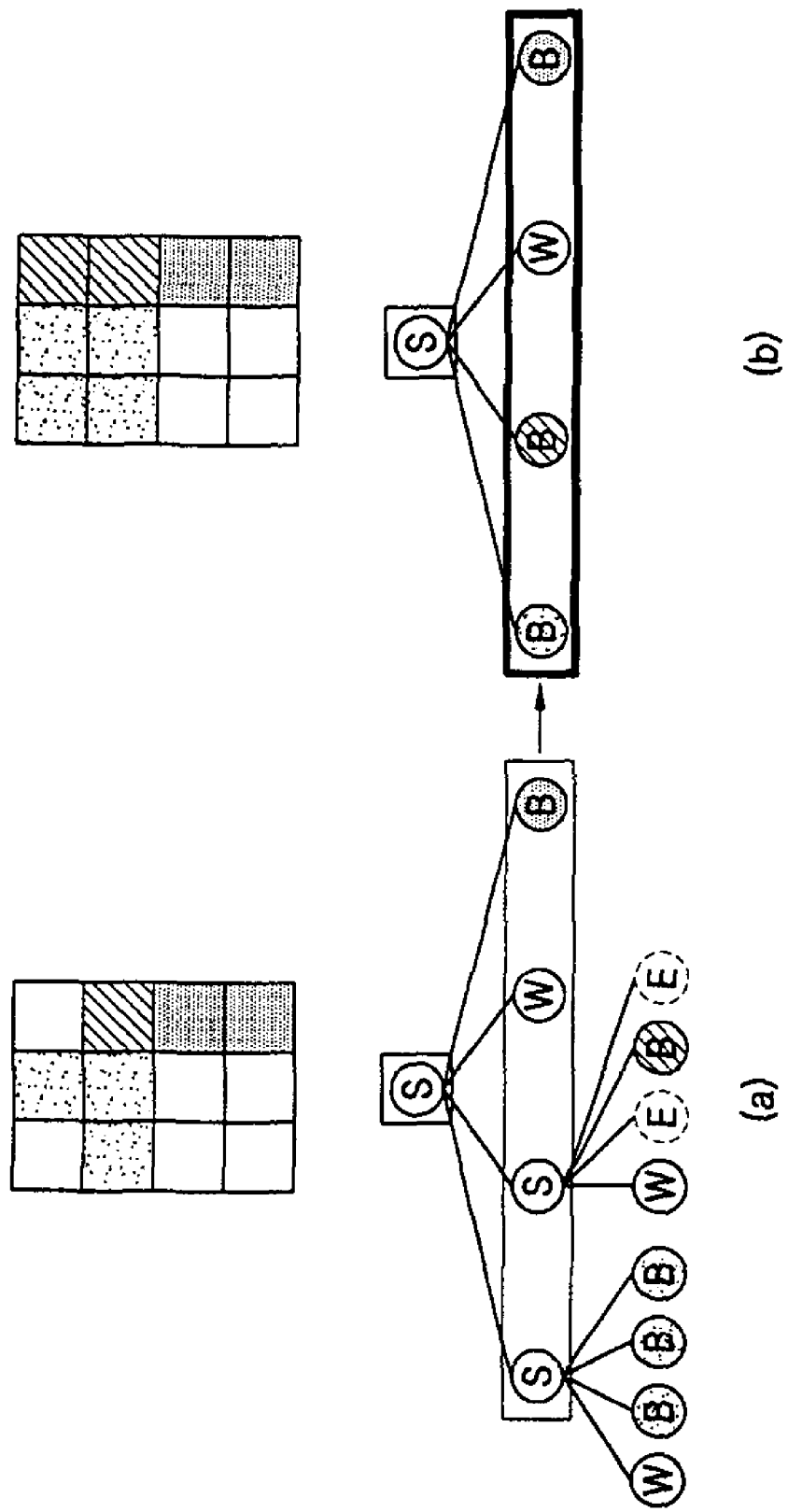
FIG. 12 illustrates labels of lower layer children nodes when a root node is encoded as an S node.

In FIG. 12(A), when the root node is encoded as an S node, the labels of the children nodes in the lower layer are S, S, W, and B, and these are actual values to be encoded. Among the labels of the children nodes in the lower layer, S is replaced by B and then encoded. Accordingly, as the nodes in the solid line rectangular in FIG. 12(B), encoding is performed with B, B, W, and B. These values are the same as values restored in a decoder.

The P node encoding unit 1140 performs PPM node encoding. The P node encoding unit 1140 encodes depth information and color information of voxels of a corresponding node by using a predetermined number of contexts. Preferably, the color information is DPCM and entropy-encoded. When necessary, at least one of the DPCM and the entropy-encoding can be omitted. Preferably, the depth information is PPM encoded. That is, for the P node encoding, first, the depth information in the volume region of the node is PPM encoded and then, the color information of the node is DPCM and AAC encoded.

Figure 13:
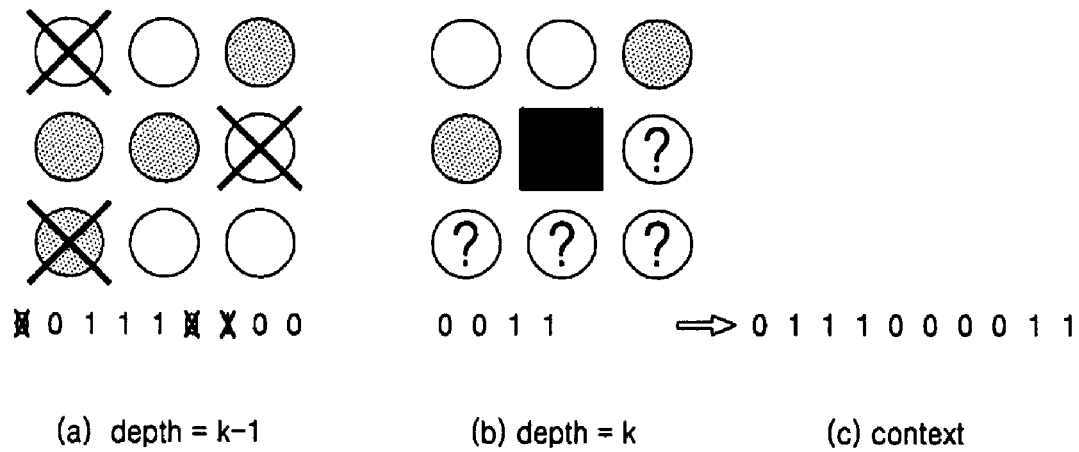
FIG. 13 illustrates a context used when a voxel is PPM encoded.

FIG. 13 illustrates a context used when a voxel is PPM encoded. A 2D plane with a depth of k at the right-hand side is a section where there are voxels previously encoded and voxels to be currently encoded. A 2D plane with a depth of k−1 at the left-hand side is an adjacent section where there are voxels previously encoded. In order to perform encoding efficiently, voxels at the locations marked by X are not used as a context, and the remaining 10 voxels each with a circle shape are used as a context and PPM encoding is performed. Accordingly, in this case, the context is reduced from '0011101000011' to '0111000011'. The arrangement order of the context follows the raster scan order.

Meanwhile, the bitstream generating unit 760 shown in FIG. 7A generates a bitstream by using the header information and the nodes encoded in the node encoding unit 740 in operation 76, and includes a header encoding unit 762 and entropy encoding unit 764. The header encoding unit 762 encodes the predetermined header information. The entropy encoding unit 764 entropy-encodes the encoded node data. When each node of the adjustable octree is an S node, a bitstream which is Split node encoded is generated and, when each node is a P node, a bitstream which is PPM node encoded is generated.

Figure 14:
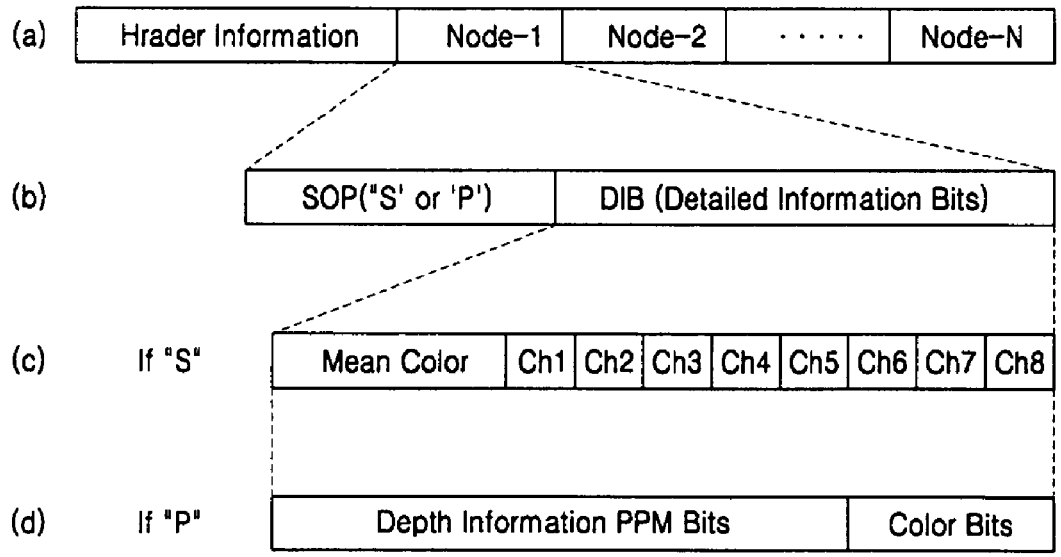
FIG. 14 illustrates a format of a bitstream generated as a result of encoding.

The header of FIG. 14(A) includes resolution information including width, height, and depth information on a 3D object. Also, it is preferable that the header further includes decoding percent information (PercentOfDecodign) indicating lossless encoding for encoding all nodes from the root node to the last node, and lossy encoding for encoding from a start node to a predetermined node. In addition, preferably, the header further includes version information of depth image-based representation data. For example, the version information can be represented by a flag, and if the value of the flag is 0, the version is 1 and if the value is 1, the version is 2.

By encoding the header information and nodes one by one from the root node in order determined by the MBFS method, a bitstream is generated. If the number of entire nodes to be encoded is N, the nodes can be expressed as Node-1, Node-2, . . . , Node-N as shown in FIG. 14(A). The bitstream of each of these nodes is formed with SOP ('S' or 'P') and detailed information bits (DIB).

If the SOP indicates that the node is an S node, the DIB is formed with the mean color of the node region and maximum 8 flags indicating whether or not children nodes are W nodes, as shown in FIG. 14(C). The 8 flags can be expressed as Ch1, Ch2, . . . , Ch8, and this indicates a case where all 8 voxel spaces are present. If there is a node lacking spaces for voxels, the same number of flags as the number of lacked voxel spaces of the node are reduced and omitted from the object list of encoding. Flag values to be encoded can be AAC encoded.

If the SOP indicates that the node is a P node, the values of voxels in the node region, that is, the depth information, is PPM encoded, as shown in FIG. 14(D), and color information of B voxel is DPCM and MC encoded in order.

PPM encoding will now be explained. As described above, the depth information is expressed by a binary voxel value. A W voxel expresses a transparent background and a B voxel indicates a voxel of a 3D object. A binary voxel value in a P node is PPM encoded by using a neighboring voxel value as a context. If according to the raster scan order, the contexts of neighboring 13 voxels are used for calculation and the data is processed, the amount of data is too big. Accordingly, there is a need to efficiently reduce the number of contexts, and 3 voxels that hardly affect the entire entropy are removed. The removed voxels were marked with 'X' as shown in FIG. 13. By using this context, the voxels are encoded by context-based AAC coding.

After the depth information is encoded, the values of the RGB colors of B voxels in the node region are DPCM and AAC encoded in the raster scan order. The R, G, B values of B voxels to be encoded are predicted from R, G, B values of previously encoded B voxels, respectively, and this prediction residual values are AAC encoded.

Figure 15:
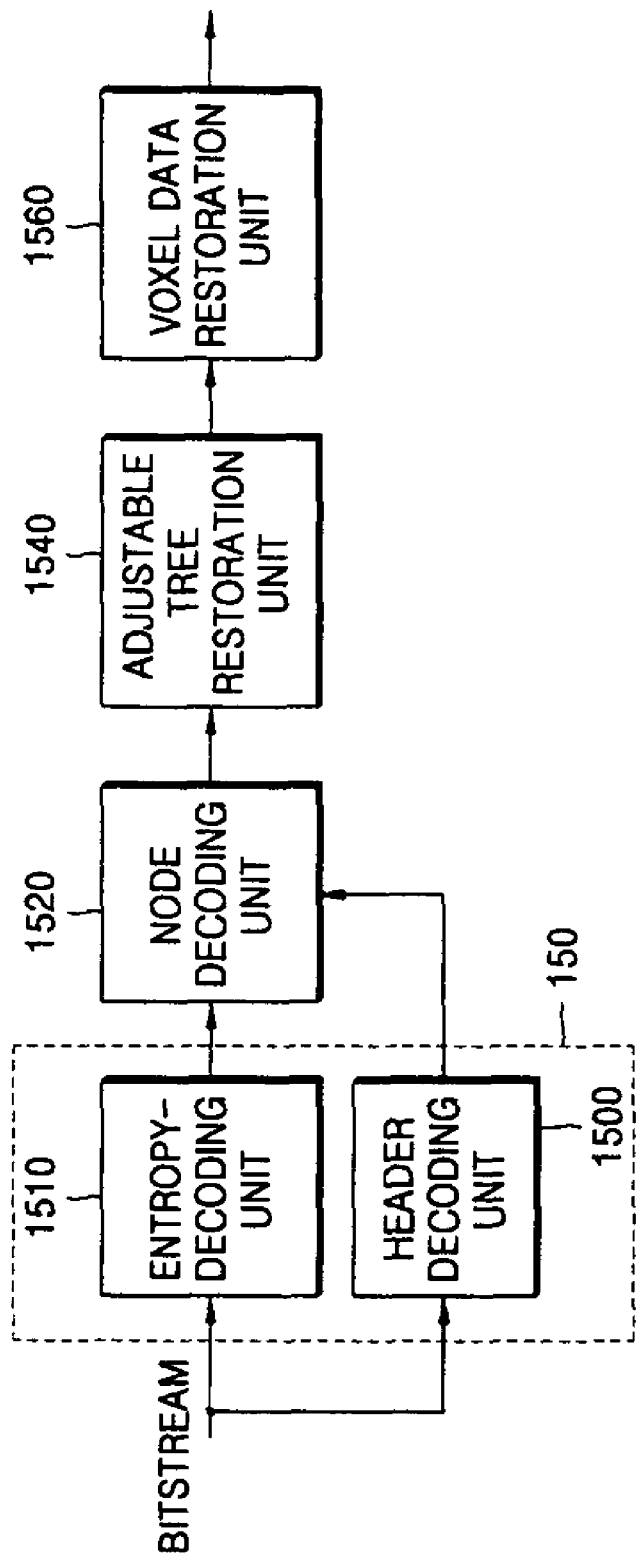
FIG. 15 is a block diagram of a 3D object data decoding apparatus according to an embodiment of the present invention.

Next, a method and apparatus for decoding 3D object according to exemplary embodiments of the present invention will now be explained. FIG. 15 is a block diagram of a 3D object data decoding apparatus according to exemplary embodiments of the present invention. The 3D object data decoding apparatus includes a bitstream reading unit 150, a node decoding unit 1520, and an adjustable tree restoration unit 1540. In addition, the bitstream reading unit 150 may include a header decoding portion 1500. The 3D object data decoding apparatus may further include a voxel data restoring unit 1560.

Basically, the 3D object data decoding apparatus according to exemplary embodiments of the present invention receives a bitstream and decodes tree node information. In order to read a bitstream, context-based adaptive arithmetic decoder can be used as the entropy-decoding unit 1510.

The header decoding unit 1500 extracts header information containing at least resolution information of an object, from the bitstream and decodes the information. Preferably, the resolution information includes the width, height, and depth data of a 3D object. When the header further includes decoding percent information (PercentOfDecoding), the header decoding unit 1500 extracts the decoding percent information from the bitstream and decodes the information. The decoding percent information (PercentOfDecoding) indicates the degree of lossy decoding for decoding from the root node to a predetermined node when nodes are decoded, and lossless decoding for decoding all nodes from the root node to the last node. Also, the header can include version information of depth image-based representation data.

When a bitstream entropy-encoded for encoding is input, the entropy-decoding unit 1510 entropy-decodes the bitstream and, preferably, uses arithmetic decoding.

When the header does not include decoding percent information, the node decoding unit 1520 calculates the number of nodes by using the resolution information of the header, and with the entropy-decoded node data, decodes each node from the root node to the leaf nodes in order by the MBFS method in which priorities are given among children nodes.

Also, when the header includes decoding percent information, the node decoding unit 1520 calculates the number of nodes to be decoded by using the number of nodes calculated by using the resolution information and the decoding percent information, and decodes the same number of nodes of the tree as the calculated number of nodes to be decoded, in order by the MBFS method from the root node in the leaf node direction.

Preferably, the MBFS method is performed by pushing the index of nodes to be decoded in the priority queue, or popping up the index from the queue., by using a priority queue. Also, preferably, with respect to the priority, the first child node of the node has a higher priority than that of the second child node, the second child node has a higher priority than that of the third child node, and in the same manner, the last child node has the lowest priority.

The MBFS can be expressed as an algorithm as follows:

```
// push root node(0) into the priority queue
Queue.push(0);
// repeat until the priority queue is empty
while(Queue.isEmpty( ) == false)
{
  // extract an index from the priority queue
  Index = Queue.pop( );
  // repeat for 8 children (from 1 to 8)
  for(Child = 1; Child <= 8; Child++)
  {
    // if the decoded child existed as 1
    if(DecodedChild[Index*8+Child] == 1)
      // push the child index into the queue
      Queue.push(Index*8+Child);
  }
}
```

Figure 16:
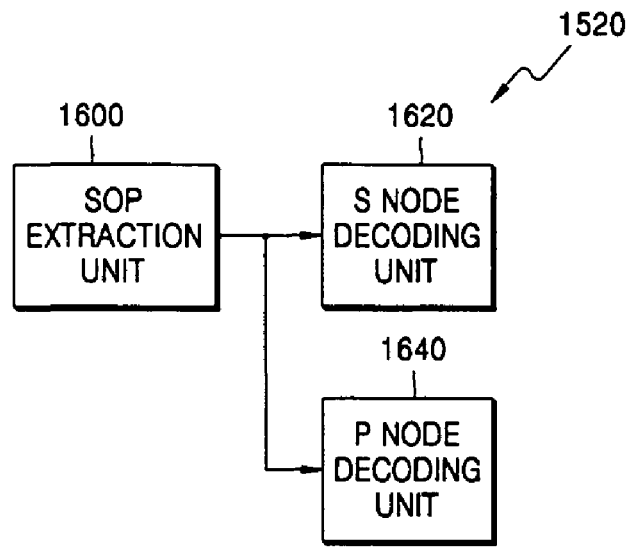
FIG. 16 is a block diagram of a detailed internal structure of a node decoding unit.

FIG. 16 is a block diagram of a detailed internal structure of the node decoding unit 1520, which includes an SOP extraction unit 1600, an S node decoding unit 1620, and a P node decoding unit 1640. The SOP extraction unit 1600 extracts encoding type information (SOP) indicating whether a node of the tree is encoded by S node encoding or P node encoding, and restores the information.

Figure 17:
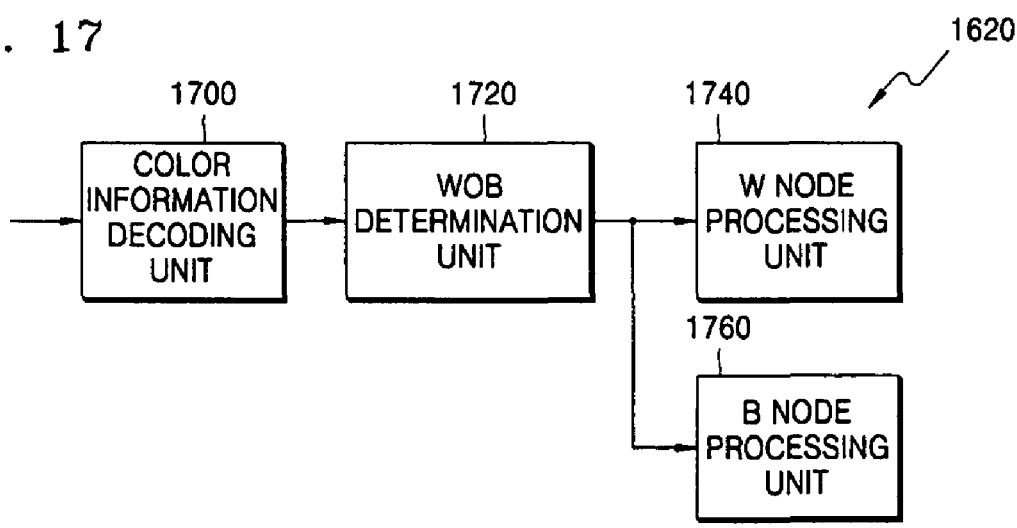
FIG. 17 is a block diagram of a detailed structure of an S node decoding unit.

If the SOP indicates S node encoding, the S node decoding unit 1620 determines that the node desired to be decoded is an S node, and decodes the S node. FIG. 17 is a block diagram of a detailed structure of the S node decoding unit 1620, which includes a color information decoding unit 1700, a WOB determination unit 1720, a W node processing unit 1740, and a B node processing unit 1760. The color information decoding unit 1700 entropy-decodes the color information of the S node. The WOB determination unit 1720 determines whether the label of a node is W or B, in relation to all children nodes of the S node. If the label of the node is W, the W node processing unit 1740 calculates the number of sub tree nodes, and skips decoding on as many children nodes as the sub tree nodes. If the label of the child node is B, the B node processing unit 1760 pushes the index of the child node in the priority queue.

Figure 18:
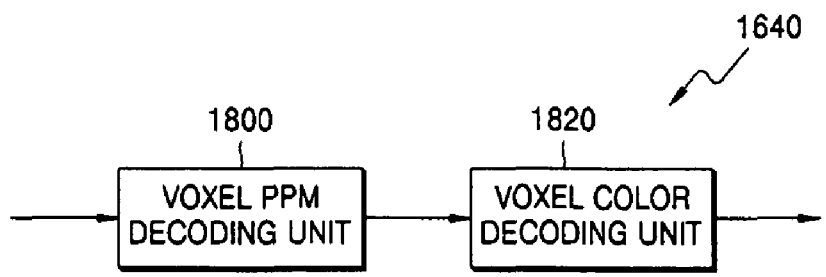
FIG. 18 is a block diagram of a detailed structure of a P node decoding unit.

If the SOP indicates P node encoding, the P node decoding unit 1640 determines that the node desired to be decoded is a P node and decodes the P node. FIG. 18 is a block diagram of a detailed structure of the P node decoding unit 1620, which includes a voxel PPM decoding unit 1800 and a voxel color decoding unit 1820. The voxel PPM decoding unit 1800 calculates a 3D volume region including width, height, and depth data using the index of the tree node, and examines whether or not there is a voxel in the volume region. IF the examination result indicates that there is a voxel, the voxel image decoding unit 1820 entropy-decodes the color information of the voxel.

The adjustable tree restoration unit 1540 shown in FIG. 15 restores an adjustable tree by using the decoded node. The voxel data restoration unit 1560 restores voxel data by using the restored adjustable tree.

Figure 19:
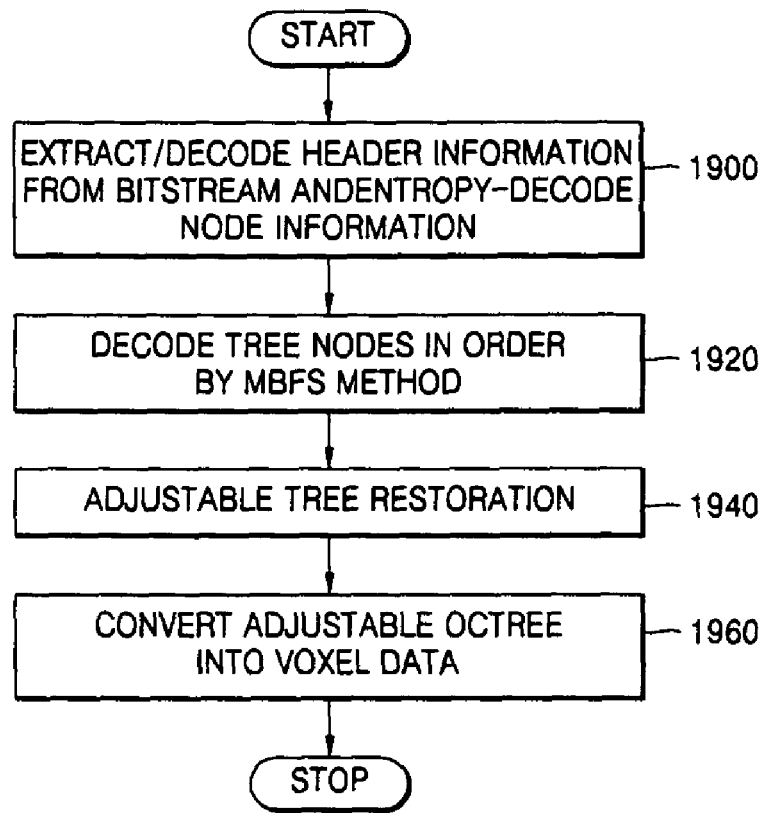
FIG. 19 is a flowchart of the operations performed by a 3D object data decoding method according to an embodiment of the present invention.

FIG. 19 is a flowchart of the operations performed by a 3D object data decoding method according to exemplary embodiments of the present invention. Referring to FIG. 19, the operation of the 3D object data decoding method and apparatus according to exemplary embodiments of the present invention will now be explained.

First, a bitstream is input, header information is restored by the header decoding unit 1500 in operation 1900. The header information has resolution information, and preferably, further includes decoding percent information. Also, the header information may further include version information of depth image-based representation data. For example, the version information can be expressed as a flag, and if the flag value is 0, it may indicate version 1, and if the flag value is 1, it may indicate version 2.

For example, the syntax of top class to read a PointTexture bitstream can be expressed as follows:

```
class PointTexture ( )
{
  PointTextureHeader ( );
  PointTextureTreeNodes ( );
}
```

Here, PointTextureHeader is a class for reading header information from the bitstream. PointTextureTreeNodes is a class for reading a tree node progressively from a low resolution to a high resolution.

Also, the syntax of PointTextureHeader class can be expressed as follows:

```
class PointTextureHeader ( )
{
  unsigned int(5) nBitSizeOfWidth;
  unsigned int(nBitSizeOfWidth) nWidth;
  unsigned int(5) nBitSizeOfHeight;
  unsigned int(nBitSizeOfHeight) nHeight;
```

```
unsigned int(5) nDepthNbBits;
unsigned int(7) nPercentOfDecoding;
}
```

Here, nBitSizeOfWidth indicates the bit size of nWidth, and nWidth indicates the width of the PointTexture. nBitSizeOfHeight indicates the bit size of nHeight, and nHeight indicates the height of the PointTexture. nDepthNbBits indicates the number of bits used to represent the original depth data, and the value of nDepthNbBits has a range from 0 to 31. Also, the number of bits used to indicate the original depth data is nDepthNbBits+1. nPercentOfDecoding indicates the percent of a tree node to be decoded. If this value is the maximum value (100), lossless decoding is performed, or else lossy decoding is performed.

Meanwhile, the syntax of PointTextureTreeNodes class can be expressed as follows:

```
class PointTextureTreeNodes ( )
{
nNumberOfTreeNodes = initializeOctree(nWidth, nHeight,
nDepthNbBits);
nNumberLimit = nNumberOfTreeNodes * nPercentOfDecoding / 100;
pushQ(0); // 0: root
nCount = 0;
while(nCount < nNumberLimit)
{
   if(isQueueEmpty( ) == true)   // break if queue is empty
      break;
   nIndex = popQ( );
   nCount++;
   nSOP = decodeAAC(contextSOP);
   if(nSOP == 0) // Split node decoding
   {
      nRegionRed = decodeAAC(contextRedOfRegion);
      nRegionGreen = decodeAAC(contextGreenOfRegion);
      nRegionBlue = decodeAAC(contextBlueOfRegion);
      for(nChild = 1; nChild <= 8; nChild++) // 8 children nodes
      {
         nBOW = decodeAAC(contextBOW); // black or white
         if(nBOW == 0) // 0: white node
            nCount += getCountOfTreeSize(nIndex*8+nChild);
         else    // 1: black node
            pushQ(nIndex*8+nChild);
      }
   }
   else   // PPM node decoding
   {
      getRegion(nIndex, nStartX, nStartY, nStartZ, nEndX,
      nEndY, nEndZ);
      for(k = nStartZ; k < nEndZ; k++)
      {
         for(j = nStartY; j < nEndY; j++)
         {
            for(i = nStartX; i < nEndX; i++)
            {
               nIndexOfContext = getIndexOfContext(i, j, k);
               nVoxel = decodeAAC(contextTreeNodes[nIndexOfContext]);
               if(nVoxel == 1) // 1: black node
               {
                  nDeltaRed = decodeAAC(contextColorDifference);
                     nDeltaGreen = decodeAAC(contextColorDifference);
                     nDeltaBlue = decodeAAC(contextColorDifference);
               }
            }
         }
      }
      nCount += getCountOfTreeSize(nIndex) - 1;
   }
}
}
```

Here, nNumberOfTreeNodes indicates the number of tree nodes in the octree. initializeOctree function initializes a resolution value expressed by nWidth, nHeight, and nDepthNbBits, and obtains the number of tree nodes in the octree.

nNumberLimit indicates the limit of tree nodes to be decoded. pushQ function inserts a value in the queue. nCount indicates the current number of tree nodes to be decoded.

isQueueEmpty function examines whether or not a queue is empty. nIndex indicates the index of a tree node to be decoded. popQ function extracts a value from the queue.

nSOP indicates whether a tree node is a Split node or a PPM node. If the value is 0, the node is a split node, or else it indicates a PPM node. decodeAAC function performs AAC decoding with a given context.

nRegionRed indicates the range of red color in a voxel region, nRegionGreen indicates the range of green color, and nRegionBlue indicates the range of blue color. nChild indicates the index of 8 children nodes to decode a Split node. nBOW indicates whether a child node is black or white.

getCountOfTreeSize function calculates the number of sub tree nodes from a tree node. getRgion function calculates a volume region (starting x, y, z and ending x, y, z) from the index of the tree node. nStartX, nStartY, and nStartZ indicate start points of the volume regions, respectively, and nEndX, nEndY, and nEndZ indicate ending points of the volume regions, respectively.

nIndexOfContext indicates the index context of the tree node from x, y, z values, and getIndexOfContent function obtains the index of the tree node context from x, y, z values. nVoxel indicates whether a voxel node is black or white.

nDeltaRed indicates the differentiated value of red color in a voxel, nDeltaGreen indicates the differentiated value of green color in a voxel, and nDeltaBlue indicates the differentiated value of blue color in a voxel.

Meanwhile, if header information includes only resolution information and does not have decoding percent information, the node decoding unit 1520 calculates the number of nodes to be decoded by using the resolution information, and decodes each node of the tree from the root node to leaf nodes in order by the MBFS method in operation 1920.

If header information includes resolution information and decoding percent information, the node decoding unit 1520 decodes the same number of tree nodes as the calculated number of nodes to be decoded, by the MBFS method from the root node in the leaf node direction. The MBFS method is performed by pushing the index of nodes to be decoded in the priority queue, or popping up the index from the queue, by using a priority queue.

More specifically, the node decoding unit 1620 first generates initial full octree nodes by using width×height×depth resolution information of a 3D object, and then, initializes the nodes with value 0 (white). If the number of tree nodes is N, the nodes to be decodes are node-1, node-2, node-3, . . . , node-N.

Since if a bitstream generated by using the MBFS method is received, the decoding order from the root node to the leaf nodes can be known, the position of a node transmitted by an encoding apparatus can be easily identified. In addition, since the number of the entire nodes can be known by using the resolution information, whether or not a transmitted node is the last node can be confirmed. When a 3D object is decoded, if the decoding apparatus uses the BFS algorithm, progressive decoding is impossible and only sequential decoding can be performed. In this case, there is a drawback that object visualization is unnatural. Accordingly, if the MBFS is used, there is an advantage that a 3D object can be visualized progressively and a more natural expression is enabled.

When the order of nodes to be decoded is determined by using the MBFS method, every first child node among children nodes has a higher priority than other children nodes. Every second child node has the next higher priority and higher than the third child node through the eighth child node. In this manner, every eighth child node that is the last node has the lowest priority than those of the previous children nodes. A decoder can know a current order of nodes to be encoded and decoded according to these priorities of the children nodes, from the parent node.

Figure 20:
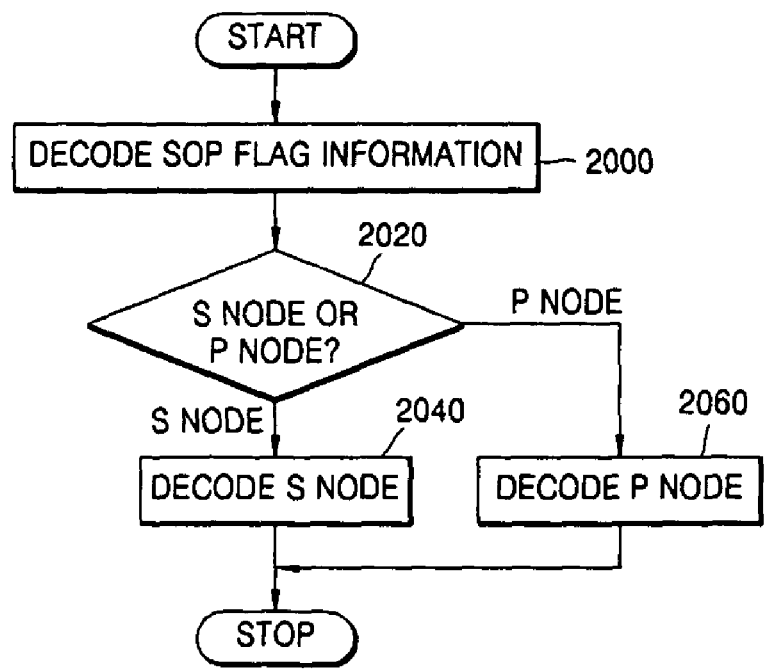
FIG. 20 is a flowchart of a node decoding process in a node decoding unit.

E nodes are not the object of encoding and decoding. FIG. 20 is a flowchart of a node decoding process in the node decoding unit 1520. First, if SOP flag information is decoded by the SOP extraction unit 1600 in operation 2000, whether a tree node is an S node or a P node is examined in operation 2020. If the examination result indicates that the node is an S node, the node is S-node-decoded by the S node decoding unit 1620 in operation 2040. If the examination result indicates that the node is a P node, the node is P-node-decoded by the P node decoding unit 1640 in operation 2060.

In the S node decoding, S node DIB is read and entropy-decoding (preferably, AAC decoding) is performed, and by doing so, color information and the presence of children node can be known. In case of S node, expression is performed by using mean color information set by the encoding apparatus. Whenever the color of each child node is received after a current node, the color is used for update and reflected to the node. That is, if SOP indicates an S node, with the DIB, the mean color of the node region and the values of flags indicating whether or not children nodes are W nodes are decoded. If there is a node having no space for voxels, the same number of flags as the lacked voxels are reduced and omitted from the object list of decoding. This E node is a virtual node and the location of the E node can be found by calculation using resolution information of the entire bounding volume.

In P node decoding, depth information of a voxel region having a P node to be decoded is restored by using an inverse PPM algorithm. The color information of a P node is restored by using entropy-decoding (preferably, MC decoding) and inverse-DPCM. More specifically, if SOP indicates a P node, the values of voxels in the node region, that is, the depth information, are PPM decoded, and the color information of a B voxel is decoded in order by inverse MC and inverse DPCM. For example, in the same manner as in the encoding shown in FIG. 13, the value of a binary voxel to be decoded in the P node is PPM-decoded by using already decoded 10 neighboring voxel values as a context. After the depth information is decoded the value of RGB color of the B voxel in the node region is decoded by reverse MC and reverse DPCM in the raster scan order. The R, G, B values of the B voxel to be decoded are obtained by inversely predicting prediction residual values decoded by inverse MC, from R, G, B values of the previously decoded B voxel, respectively.

If the bitstream is decoded in units of nodes in this method, then, restoration of an adjustable octree with attached labels is performed in operation 1940.

Figure 21:
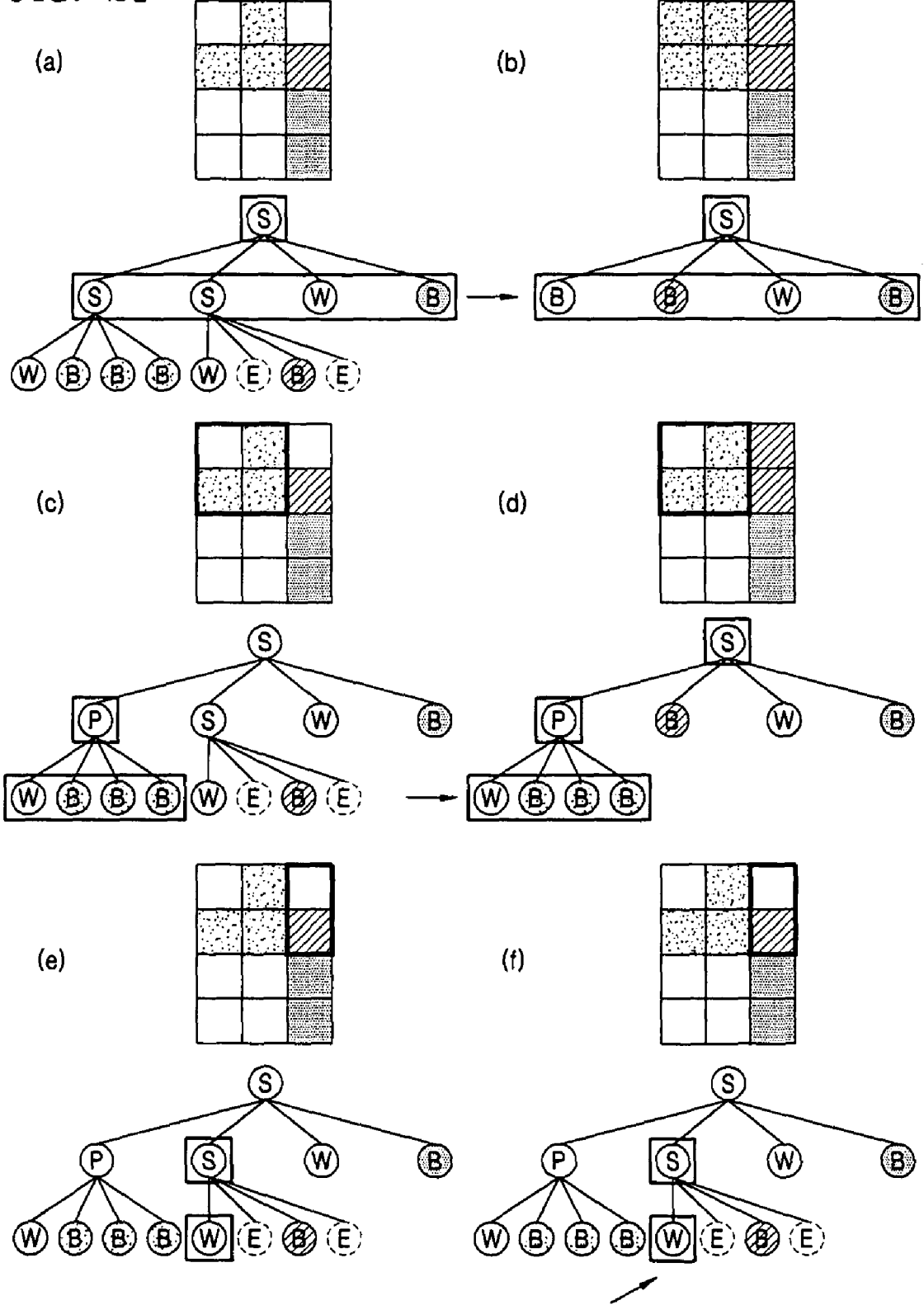
FIG. 21 illustrates a simple example of restoring an adjustable octree in a 3×4 resolution.

FIG. 21 illustrates a simple example of restoring an adjustable octree in a 3×4 resolution. FIGS. 21(B), (D), and (F) show a reconstruction process with respect to decoding, while FIGS. 21(A), (C), and (E) show a construction process with respect to encoding. In FIGS. (B), (D), and (F), blue rectangles indicate a node being currently decoded, and green rectangle indicate children nodes being currently decoded. In FIG. 21(B), the node being currently decoded indicates a Split node and children nodes are B, B, W, and B. In FIG. 21(D), the node being currently decoded indicates a PPM node and children nodes are W, B, B, and B. In FIG. 21(F), the node being currently decoded indicates a Split node and children nodes are W and B. In this case, E nodes are not decoded.

If the adjustable octree with attached labels is restored, the octree is converted into voxel data in operation 1960. The resolution of the voxel data is width×height×depth. If the voxel data is restored, it can be easily converted into the original PointTexture data. That is, the converted PointTexture expresses the restored 3D object by using the depth information and color information. Thus, with the octree and efficient compression method, progressive restoration is enabled.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

As described above, the 3D volume data encoding and decoding method and apparatus according to exemplary embodiments of the present invention can encode a huge amount of 3D volume data with a high efficiency, and encode volume data with an arbitrary resolution as well as volume data with a fixed resolution with a high efficiency. Accordingly, with a small amount of data, 3D volume data with a high picture quality can be restored. In addition, since a progressive bitstream is generated, 3D volume data can be shown progressively when decoding is performed.

Figure 22:
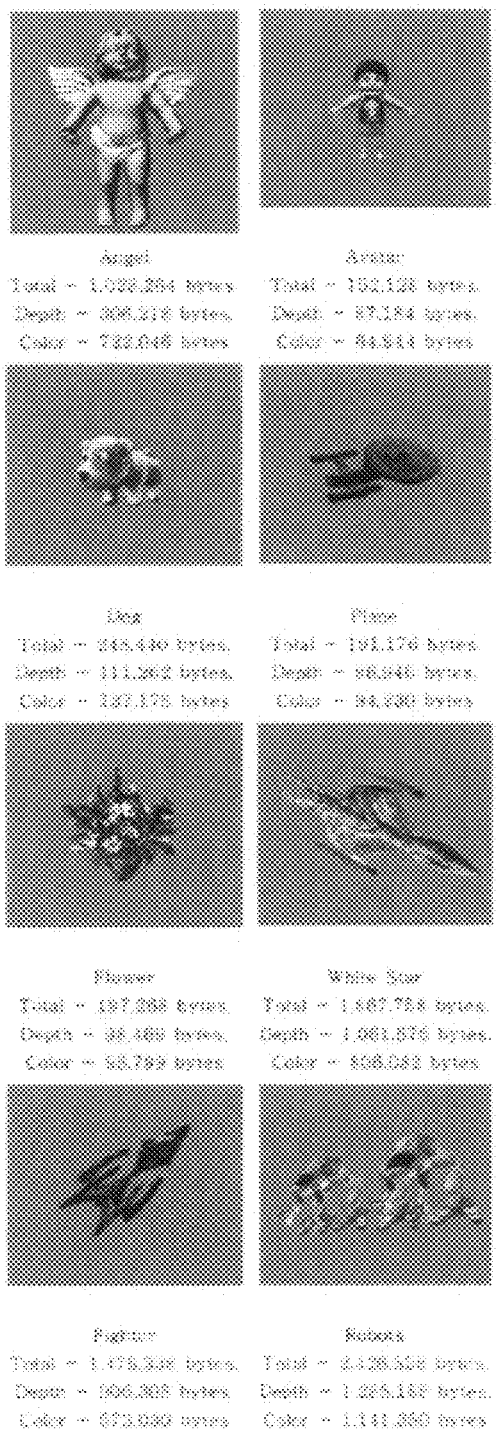
FIG. 22 illustrates 8 PointTexture test models that are used to test performances of the 3D volume data encoding and decoding method and apparatus according to an embodiment of the present invention.

In order to test the performance of the 3D volume data encoding and decoding method and apparatus according to exemplary embodiments of the present invention, 8 PointTexture test models as shown in FIG. 22 were used.

Tables 2 through 4 compare the compression performance of the method according to exemplary embodiments of the present invention with those of WinZip that is a universal Lempel-Ziv compression method, and the compression method used in the conventional method:

TABLE 2

| | DEPTH | | | | |
|---|---|---|---|---|---|
| | N | P | W | R1 | R2 |
| Angel | 19,967 | 34,188 | 150,853 | 0.42 | 0.87 |
| Avatar | 3,771 | 6,186 | 14,407 | 0.39 | 0.74 |
| Dog | 5,608 | 11,144 | 34,256 | 0.5 | 0.84 |
| Plane | 2,399 | 5,048 | 9,771 | 0.52 | 0.75 |
| Flower | 11,985 | 17,712 | 30,243 | 0.32 | 0.6 |
| WhiteStar | 37,967 | 74,287 | 250,174 | 0.49 | 0.85 |
| Fighter | 21,131 | 36,958 | 173,124 | 0.43 | 0.88 |
| Robots | 51,578 | 103,004 | 330,815 | 0.5 | 0.84 |

TABLE 3

| | COLOR | | | | |
|---|---|---|---|---|---|
| | N | P | W | R1 | R2 |
| Angel | 227,138 | 239,400 | 402,118 | 0.05 | 0.44 |
| Avatar | 35,807 | 35,970 | 46,475 | 0 | 0.23 |
| Dog | 63,533 | 64,616 | 112,734 | 0.02 | 0.44 |
| Plane | 48,356 | 51,409 | 47,245 | 0.06 | –0 |
| Flower | 63,209 | 65,055 | 80,721 | 0.03 | 0.22 |
| WhiteStar | 429,941 | 443,039 | 725,630 | 0.03 | 0.41 |
| Fighter | 283,172 | 276,950 | 414,241 | –0 | 0.32 |
| Robots | 656,762 | 671,637 | 939,136 | 0.02 | 0.3 |

TABLE 4

| | TOTAL | | | | |
|---|---|---|---|---|---|
| | N | P | W | R1 | R2 |
| Angel | 247,105 | 273,588 | 552,971 | 0.1 | 0.55 |
| Avatar | 39,578 | 42,156 | 60,882 | 0.06 | 0.35 |
| Dog | 69,141 | 75,760 | 146,990 | 0.09 | 0.53 |
| Plane | 50,755 | 56,457 | 57,016 | 0.1 | 0.11 |
| Flower | 75,194 | 82,767 | 110,964 | 0.09 | 0.32 |
| WhiteStar | 467,908 | 517,326 | 975,804 | 0.1 | 0.52 |
| Fighter | 304,303 | 313,908 | 587,365 | 0.03 | 0.48 |
| Robots | 708,340 | 774,641 | 1,269,951 | 0.09 | 0.44 |

With respect to the size of data, Avatar data was the smallest with 152,128 bytes and Robots data is the largest with 2,426,538 bytes. Also, most data items had depth information and color information with similar sizes. According to the test results, the performance of Flower data improved by 60% when compared with Winzip. Also, it can be seen that the performance of Plane data improved by 52% when compared with the conventional method.

In depth information, the method according to exemplary embodiments of the present invention showed a 32~52% improvement in compression ratio over the conventional method. That is, the method according to exemplary embodiments of the present invention removed unnecessary information and to compensate for this, used the MBFS algorithm such that the compression ratio could be improved. While WinZip compression method could not support progressive transmission and decoding, it can be seen that the method according to exemplary embodiments of the present invention supports the progressive transmission and decoding and is also excellent in the compression performance.

Figure 23:
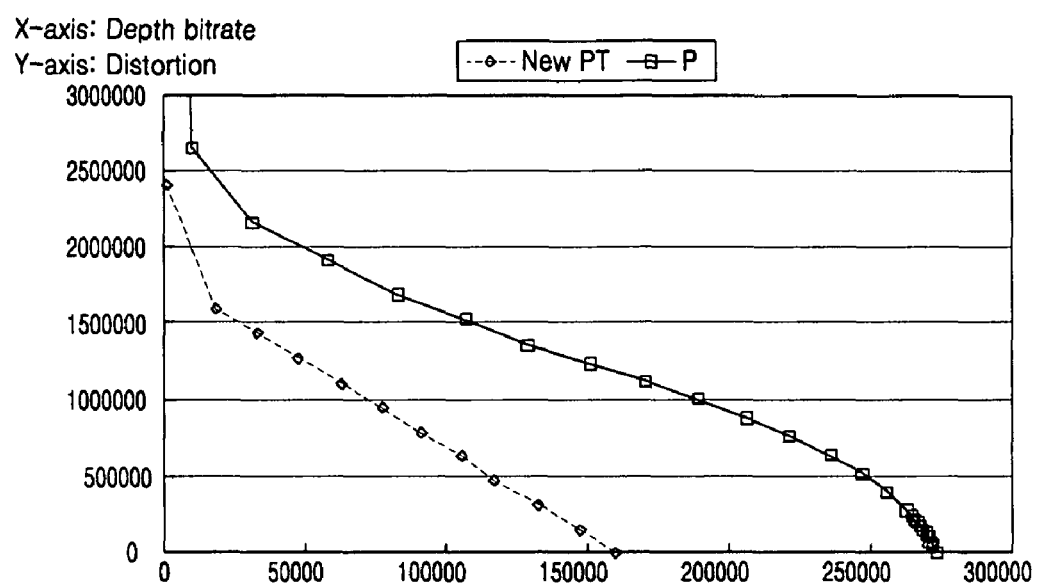
FIG. 23 shows rate-distortion (RD) curves indicating a distortion degree with respect to a transmitted bitstream.

FIG. 23 shows rate-distortion (RD) curves indicating a distortion degree with respect to a transmitted bitstream. The distortion degree of the transmitted bitstream is obtained by using Hamming Distance formula as the following equation 1:

$$D = \sum_{x=1}^{X} \sum_{y=1}^{Y} \sum_{z=1}^{Z} |V(x, y, z) - \hat{V}(x, y, z)| \quad (1)$$

Here, V(x, y, z) originally indicates the presence of a point of a 3D object, and when it is 0, it indicates that there is no point, and when it is 1, it indicates that there is a point.

Figure 24:
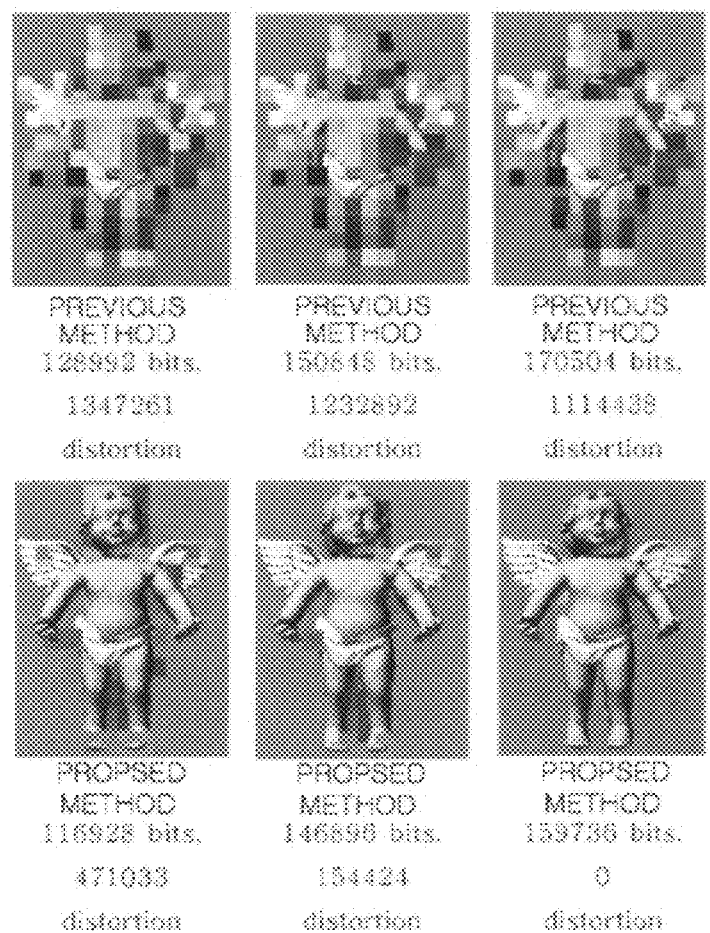
FIG. 24 illustrates distortion degrees of Angel data expressed by picture qualities.

The result of the text shows that when identical bits were transmitted, the method of the present invention showed a great improvement with respect to the distortion ratio. FIG. 24 illustrates distortion degrees of Angel data expressed by picture qualities.

It can be confirmed that when bitstream of similar amounts were transmitted, the method according to exemplary embodiments of the present invention is better with respect to the picture quality. It can be known that in case of the method according to exemplary embodiments of the present invention, when 159,736-bit information was transmitted, the distortion ratio was 0, while in case of the conventional method, even when 170,504 bits were transmitted, the distortion of about 1,114,438 bits occurred still. In the conventional method, a node minimizing distortion in an RD curve is encoded and transmitted with priority. For this, a node capable of reducing the slope is selected and transmitted, and together with this, the location information of the node is transmitted. In the present invention, these additional information items were removed such that the RD curve was improved and an improved result could be obtained.

Thus, the result of encoding and decoding tests showed that the method according to exemplary embodiments of the present invention improved the compression ratio and picture qualities. When a bitstream was generated, location information and information indicating whether or not nodes continue were removed and by using the MBFS algorithm using a priority queue in order to compensate for this removal, the improved result in the compression ratio could be obtained. As a result, compared with the conventional method, even when the identical amount of bits was transmitted, the distortion degree was reduced such that the better result could be obtained.

Accordingly, the method according to exemplary embodiments of the present invention can compress PointTexture depth data more effectively than the conventional method, and in addition, when a bitstream is progressively transmitted, the method of the present invention can express a 3D object with more natural visualization. The present invention suggests a method capable of reducing the amount of information forming a bitstream in order to implement more efficient compression, and even when the information is removed by using the MBFS or resolution information thereafter, decoding and expression can be performed without any problems. The test result showed a 32~52% improvement by the method for depth data. Also, since the MBFS algorithm supports progressive visualization, more natural result with respect to the visual quality of the 3D object could be obtained.

What is claimed is:

1. A 3D volume data decoding method comprising:
   extracting header information containing at least resolution information of an object, from a bitstream and decoding the header information at a bitstream reading unit of a decoding apparatus;
   calculating a number of nodes by using the resolution information of the header, and by a modified breadth-first search (BFS) method allocating priorities among children nodes, decoding each node of a tree from a root node to leaf nodes at a node decoding unit of the decoding apparatus; and
   restoring an adjustable tree by using the decoded nodes at a tree restoration unit of the decoding apparatus.

2. The method of claim 1, wherein the resolution information in the extracting header information includes width, height, and depth data of a 3D object.

3. The method of claim 1, wherein the extracting and decoding of the header information further comprises:
   extracting decoding percent information (PercentOfDecoding) indicating a lossy decoding degree to decode from the root node to a predetermined node when a node is decoded and lossless decoding to decode all nodes from the root node to the last node, and decoding the information.

4. The method of claim 1, wherein in the extracting and decoding of the header information, header information including at least resolution information of an object and version information of depth image-based representation data is extracted from the bitstream and decoded.

5. The method of claim 4, wherein by using a priority queue, the modified BFS method is performed by pushing the index of a node to be decoded in the priority queue and popping up the index from the queue.

6. The method of claim 5, wherein with respect to the priorities, the priority of a first child node of a node is higher than that of a second child node, the priority of the second child node is higher than that of a third child node, and in the same manner, the last node has the lowest priority.

7. The method of claim 6, wherein the decoding of the tree node comprises:
   decoding encoding type information (SOP) indicating whether the tree node is encoded by S node encoding or P node encoding;
   if the SOP indicates the S node encoding, determining that the node desired to be decoded is an S node, and decoding the S node; and
   if the SOP indicates the P node encoding, determining that the node desired to be decoded is a P node, and decoding the P node.

8. The method of claim 7, wherein the S node decoding comprises:
   entropy-decoding the color information of the S node;
   determining whether the label of a node is W or B in each of the children nodes of the S node;
   if the label of the child node is W, calculating the number of sub tree nodes and skipping decoding on as many children nodes as the sub tree nodes; and
   if the label of the child node is B, pushing the index of the child node in the priority queue.

9. The method of claim 7, wherein the P node decoding comprises:
   calculating a 3D volume region represented by width, height, and depth data from the index of a tree node; and
   checking whether or not there is a voxel in the volume region, and if there is a voxel, entropy-decoding the color information of the voxel.

10. The method of claim 1, wherein the extracting and decoding of the header information further comprises extracting node information from the bitstream and entropy-encoding the extracted node information.

11. The method of claim 1, wherein in the calculating of the number of nodes and the decoding of each node, by using the number of nodes calculated by using the resolution information and the decoding percent information, the number of nodes to be decoded is calculated, and by the modified BFS method allocating priorities among children nodes, in the leaf nodes direction beginning from the root node, the same number of tree nodes as the number of the nodes to be decoded are decoded.

12. The method of claim 1, further comprising converting the restored adjustable tree data into voxel data.

13. A non-transitory computer readable recording medium having embodied thereon a computer program for the method of claim 1.

14. A 3D volume data decoding apparatus comprises:
    a header decoding unit extracting header information containing at least resolution information of an object, from a bitstream and decoding the header information;
    a node decoding unit calculating a number of nodes by using the resolution information of the header, and by a modified breadth-first search (BFS) method allocating priorities among children nodes, decoding each node of a tree from a root node to leaf nodes; and
    an adjustable tree restoration unit restoring an adjustable tree by using decoded nodes.

15. The apparatus of claim 14, wherein the resolution information in the extracting header information includes width, height, and depth data of a 3D object.

16. The apparatus of claim 15, wherein when the header further comprises decoding percent information (PercentOfDecoding) indicating a lossy decoding degree to decode from the root node to a predetermined node when a node is decoded and lossless decoding to decode all nodes from the root node to the last node, the header decoding unit extracts the decoding percent information from the bitstream and decodes the information.

17. The apparatus of claim 16, wherein by using the number of nodes calculated by using the resolution information and the decoding percent information, the node decoding unit calculates the number of nodes to be decoded, and by the modified BFS method allocating priorities among children nodes, in the leaf nodes direction beginning from the root node, decodes the same number of tree nodes as the number of the nodes to be decoded.

18. The apparatus of claim 17, wherein with respect to the priorities, the priority of a first child node of a node is higher than that of a second child node, the priority of the second child node is higher than that of a third child node, and in the same manner, the last node has the lowest priority.

19. The apparatus of claim 14, wherein the header decoding unit extracts header information including at least resolution information of an object and version information of depth image-based representation data, from the bitstream and decodes the header information.

20. The apparatus of claim 14, further comprising an entropy-decoding portion extracting node information from the bitstream and entropy-decoding the extracted node information.

21. The apparatus of claim 20, wherein by using a priority queue, the modified BFS method is performed by pushing the index of a node to be decoded in the priority queue and popping up the index from the queue.

22. The apparatus of claim 21, wherein the node decoding unit comprises:
    an SOP restoration unit extracting and restoring encoding type information (SOP) indicating whether the tree node is encoded by S node encoding or P node encoding;
    an S node decoding unit, if the SOP indicates the S node encoding, determining that the node desired to be decoded is an S node, and decoding the S node; and
    a P node decoding unit, if the SOP indicates the P node encoding, determining that the node desired to be decoded is a P node, and decoding the P node.

23. The apparatus of claim 22, wherein the S node decoding unit comprises:
    a color information decoding unit entropy-decoding the color information of the S node;

a WOB determination unit determining whether the label of a node is W or B in each of the children nodes of the S node;

a W node processing unit, if the label of the child node is W, calculating the number of sub tree nodes and skipping decoding on as many children nodes as the sub tree nodes; and a B node processing unit, if the label of the child node is B, pushing the index of the child node in the priority queue.

24. The apparatus of claim 22, wherein the P node decoding unit comprises:

a voxel PPM decoding unit calculating a 3D volume region represented by width, height, and depth data, from the index of a tree node, and checking whether or not there is a voxel in the volume region; and a voxel color decoding unit, if there is a voxel, entropy-decoding the color information of the voxel.

25. The apparatus of claim 14, further comprising a voxel data restoration unit restoring voxel data by using the restored adjustable tree.

* * * * *